(12) United States Patent
Crawford et al.

(10) Patent No.: US 9,982,125 B2
(45) Date of Patent: *May 29, 2018

(54) CLEAR SEMI-CRYSTALLINE ARTICLES WITH IMPROVED HEAT RESISTANCE

(71) Applicant: Eastman Chemical Company, Kingsport, TN (US)

(72) Inventors: Emmett Dudley Crawford, Kingsport, TN (US); Michael Eugene Donelson, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/492,685

(22) Filed: Apr. 20, 2017

(65) Prior Publication Data

US 2017/0218194 A1     Aug. 3, 2017

Related U.S. Application Data

(63) Continuation of application No. 13/398,262, filed on Feb. 16, 2012, now abandoned.

(51) Int. Cl.
*C08L 67/02* (2006.01)
*C08G 63/199* (2006.01)

(52) U.S. Cl.
CPC ............ *C08L 67/02* (2013.01); *C08G 63/199* (2013.01); *C08L 2201/10* (2013.01); *C08L 2203/10* (2013.01); *C08L 2205/02* (2013.01)

(58) Field of Classification Search
CPC ...... C08L 67/02; C08L 2666/18; C08L 69/00; C08L 2666/02; C08L 101/00; C08L 2205/00; C08G 63/199; C08J 2367/02; C08J 5/18

See application file for complete search history.

(56) References Cited

U.S. PATENT DOCUMENTS

| | | |
|---|---|---|
| 1,602,699 A | 10/1926 | Nightingale |
| 2,160,841 A | 6/1939 | Dreyfus |
| 2,202,046 A | 5/1940 | Dreyfus et al. |
| 2,278,537 A | 4/1942 | Dreyfus et al. |
| 2,720,507 A | 10/1955 | Caldwell |
| 2,806,064 A | 9/1957 | McKlveen |
| 2,901,466 A | 8/1959 | Kibler |
| 2,936,324 A | 5/1960 | Hasek et al. |
| 3,030,335 A | 9/1961 | Hasek et al. |
| 3,062,852 A | 11/1962 | Martin et al. |
| 3,075,952 A | 1/1963 | Coover et al. |
| 3,091,600 A | 5/1963 | Caldwell et al. |
| 3,169,121 A | 2/1965 | Goldberg et al. |
| 3,190,928 A | 6/1965 | Elam et al. |
| 3,201,474 A | 8/1965 | Hasek et al. |
| 3,207,814 A | 9/1965 | Goldberg et al. |
| 3,218,372 A | 11/1965 | Okamura et al. |
| 3,227,764 A | 1/1966 | Martin et al. |
| 3,236,899 A | 2/1966 | Clark |
| 3,249,652 A | 5/1966 | Quisenberry |
| 3,259,469 A | 7/1966 | Painter et al. |
| 3,287,390 A | 11/1966 | Poos et al. |
| 3,288,854 A | 11/1966 | Martin |
| 3,312,741 A | 4/1967 | Martin |
| 3,313,777 A | 4/1967 | Elam et al. |
| 3,317,466 A | 5/1967 | Caldwell et al. |
| 3,329,722 A | 7/1967 | Rylander |
| 3,360,547 A | 12/1967 | Wilson et al. |
| 3,366,689 A | 1/1968 | Maeda et al. |
| 3,386,935 A | 6/1968 | Jackson et al. |
| 3,403,181 A | 9/1968 | Painter et al. |
| T858,012 I4 | 1/1969 | Caldwell et al. |
| 3,484,339 A | 12/1969 | Caldwell |
| 3,502,620 A | 3/1970 | Caldwell |
| T873,016 I4 | 4/1970 | Gilkey et al. |

(Continued)

FOREIGN PATENT DOCUMENTS

| | | |
|---|---|---|
| BE | 615850 | 4/1962 |
| CA | 2035149 | 8/1991 |

(Continued)

OTHER PUBLICATIONS

Abstract of U.S. Defense Publication T869,015, 869 O.G. 714, Dec. 16, 1969.
Abstract of U.S. Defense Publication T875,010, 875 O.G. 342, Jun. 9, 1970.
Chen et al., "The molecular basis for the relationship between the secondary relaxation and mechanical properties of a series of polyester copolymer glasses," Marcromolecules, 32:5944-5955 (1999).
Coover, H. et al., "Copolyester Molding Compositions," Chemical Abstracts Service, XP002391844, Jun. 1970.
Kelsey, E. et al., "High Impact, Amorphous Terephthalate Copolyesters of Rigid 2,2,4,4-Tetramethyl-1,3-cyclobutanediol with Flexible Diols," Macromolecules, vol. 33, 2000, pp. 5810-5818, American Chemical Society.
"Plastic Additives Handbook," 5$^{th}$ Edition, 2001, pp. 98-108 and pp. 109-112 (Hanser Gardner Publications, Inc., Cincinnati, OH.
Bergen, R. L., Jr., "Stress Cracking of Rigid Thermoplastics," SPE Journal, Jun. 1962.

(Continued)

*Primary Examiner* — Ling Choi
*Assistant Examiner* — Gennadiy Mesh
(74) *Attorney, Agent, or Firm* — Robert C. Morriss

(57) ABSTRACT

A clear, semi-crystalline, strain induced crystallized article comprising at least one polyester which comprises: (a) a dicarboxylic acid component comprising: i) 95 to 99.99 mole % of terephthalic acid residues; and ii) 0.01 to 5 mole % of isophthalic acid; and (b) a glycol component comprising: i) 4.9 to 10.2 mole % of 2,2,4,4-tetramethyl-1,3-cyclobutanediol residues; and ii) 89.8 to 95.1 mole % of 1,4-cyclohexanedimethanol residues, wherein the polyester is solid stated and has an inherent viscosity from 0.76 to 1.1 dL/g and a glass transition temperature (Tg) of 90 to 110° C. The article has strain induced crystallinity from 15% to 35% when stretched at a draw ratio of 3 to 4 times at a temperature 10° C. above the Tg or from 23.2% to 35% when stretched at a draw ratio of 3.5 to 4.5 times at a temperature 20° C. above the Tg.

9 Claims, 1 Drawing Sheet

(56) References Cited

U.S. PATENT DOCUMENTS

| | | |
|---|---|---|
| 3,541,059 A | 11/1970 | Schaper |
| 3,546,177 A | 12/1970 | Kibler et al. |
| 3,629,202 A | 12/1971 | Gilkey et al. |
| RE27,682 E | 6/1973 | Hermann et al. |
| 3,772,405 A | 11/1973 | Hamb |
| 3,799,953 A | 3/1974 | Freitag et al. |
| 3,845,884 A | 11/1974 | Freitag et al. |
| 3,915,913 A | 10/1975 | Jackson, Jr. et al. |
| 3,962,189 A | 6/1976 | Russin et al. |
| 4,001,184 A | 1/1977 | Scott |
| 4,010,145 A | 3/1977 | Russin et al. |
| 4,046,933 A | 9/1977 | Stefanik |
| 4,056,504 A | 11/1977 | Grundmeier et al. |
| 4,084,889 A | 4/1978 | Vischer, Jr. |
| 4,125,572 A | 11/1978 | Scott |
| 4,156,069 A | 5/1979 | Prevorsek et al. |
| 4,160,383 A | 7/1979 | Rauschenberger |
| 4,185,009 A | 1/1980 | Idel et al. |
| 4,188,314 A | 2/1980 | Fox et al. |
| 4,194,038 A | 3/1980 | Baker et al. |
| 4,263,364 A | 4/1981 | Seymour et al. |
| 4,264,751 A | 4/1981 | Scheibelhoffer |
| 4,356,299 A | 10/1982 | Cholod et al. |
| 4,367,186 A | 1/1983 | Adelmann et al. |
| 4,372,455 A | 1/1983 | Adelmann et al. |
| 4,384,106 A | 5/1983 | Go et al. |
| 4,391,954 A | 7/1983 | Scott |
| 4,424,140 A | 1/1984 | Weinberg et al. |
| 4,426,512 A | 1/1984 | Barbee et al. |
| 4,427,614 A | 1/1984 | Barham et al. |
| 4,430,484 A | 2/1984 | Quinn |
| 4,431,793 A | 2/1984 | Rosenquist |
| 4,452,933 A | 6/1984 | McCready |
| 4,465,820 A | 8/1984 | Miller et al. |
| 4,469,861 A | 9/1984 | Mark et al. |
| 4,480,086 A | 10/1984 | O'Neill |
| 4,525,504 A | 6/1985 | Morris et al. |
| 4,578,295 A | 3/1986 | Jabarin |
| 4,578,437 A | 3/1986 | Light et al. |
| 4,642,959 A | 2/1987 | Swiech, Jr. et al. |
| 4,738,880 A | 4/1988 | Asada et al. |
| 4,749,773 A | 6/1988 | Weaver et al. |
| 4,786,692 A | 11/1988 | Allen et al. |
| 4,816,308 A | 3/1989 | Shimizu et al. |
| 4,826,903 A | 5/1989 | Weaver et al. |
| 4,845,188 A | 7/1989 | Martini et al. |
| 4,846,359 A | 7/1989 | Weaver et al. |
| 4,882,412 A | 11/1989 | Weaver et al. |
| 4,892,922 A | 1/1990 | Weaver et al. |
| 4,892,923 A | 1/1990 | Weaver et al. |
| 4,937,134 A | 6/1990 | Schrenk et al. |
| 4,939,186 A | 7/1990 | Nelson et al. |
| 4,976,057 A | 12/1990 | Bianchi |
| 4,981,898 A | 1/1991 | Bassett |
| 4,985,342 A | 1/1991 | Muramoto et al. |
| 5,017,679 A | 5/1991 | Chang et al. |
| 5,017,680 A | 5/1991 | Sublett |
| 5,034,252 A | 7/1991 | Nilsson et al. |
| 5,104,450 A | 4/1992 | Sand et al. |
| 5,118,760 A | 6/1992 | Blakely et al. |
| 5,118,847 A | 6/1992 | Jackson et al. |
| 5,142,088 A | 8/1992 | Phelps et al. |
| 5,169,994 A | 12/1992 | Sumner, Jr. et al. |
| 5,183,863 A | 2/1993 | Nakamura et al. |
| 5,191,038 A | 3/1993 | Krabbenhoft et al. |
| 5,207,967 A | 5/1993 | Small et al. |
| 5,217,128 A | 5/1993 | Small et al. |
| 5,224,958 A | 7/1993 | Warunek et al. |
| 5,239,020 A | 8/1993 | Morris |
| 5,256,761 A | 10/1993 | Blount, Jr. |
| 5,258,556 A | 11/1993 | Sumner, Jr. et al. |
| 5,268,219 A | 12/1993 | Harada et al. |
| 5,288,715 A | 2/1994 | Machell et al. |
| 5,288,764 A | 2/1994 | Rotter et al. |
| 5,292,783 A | 3/1994 | Buchanan et al. |
| 5,310,611 A | 5/1994 | Okabe et al. |
| 5,310,787 A | 5/1994 | Kutsuwa et al. |
| 5,326,584 A | 7/1994 | Kamel et al. |
| 5,331,034 A | 7/1994 | Pfahler et al. |
| 5,333,073 A | 7/1994 | Suzuki |
| 5,354,791 A | 10/1994 | Gallucci |
| 5,372,864 A | 12/1994 | Weaver et al. |
| 5,372,879 A | 12/1994 | Handa et al. |
| 5,378,796 A | 1/1995 | George et al. |
| 5,382,292 A | 1/1995 | Conroy et al. |
| 5,384,377 A | 1/1995 | Weaver et al. |
| 5,474,735 A | 12/1995 | Krishnakumar et al. |
| 5,475,144 A | 12/1995 | Watson et al. |
| 5,480,926 A | 1/1996 | Fagerburg et al. |
| 5,486,562 A | 1/1996 | Borman et al. |
| 5,489,665 A | 2/1996 | Yamato et al. |
| 5,494,992 A | 2/1996 | Kanno et al. |
| 5,498,668 A | 3/1996 | Scott |
| 5,498,688 A | 3/1996 | Oshino et al. |
| 5,506,014 A | 4/1996 | Minnick |
| 5,523,382 A | 6/1996 | Beavers et al. |
| 5,534,609 A | 7/1996 | Lewis et al. |
| 5,552,512 A | 9/1996 | Sublett |
| 5,591,530 A | 1/1997 | Warner et al. |
| 5,633,340 A | 5/1997 | Hoffman et al. |
| 5,650,453 A | 7/1997 | Eckberg et al. |
| 5,654,347 A | 8/1997 | Khemani et al. |
| 5,656,715 A | 8/1997 | Dickerson et al. |
| 5,668,243 A | 9/1997 | Yau et al. |
| 5,681,918 A | 10/1997 | Adams et al. |
| 5,688,874 A | 11/1997 | Hoffman |
| 5,696,176 A | 12/1997 | Khemani et al. |
| 5,705,575 A | 1/1998 | Kelsey |
| 5,780,130 A * | 7/1998 | Hansen ............... B29C 49/08 215/374 |
| 5,783,307 A | 7/1998 | Fagerburg et al. |
| 5,804,617 A | 9/1998 | Hoffman et al. |
| 5,814,679 A | 9/1998 | Eckberg et al. |
| 5,859,116 A | 1/1999 | Shih |
| 5,863,622 A | 1/1999 | Jester |
| 5,902,631 A | 5/1999 | Wang et al. |
| 5,907,026 A | 5/1999 | Factor et al. |
| 5,912,307 A * | 6/1999 | Paschke ............... B65D 1/0207 525/444 |
| 5,918,754 A | 7/1999 | Lyons et al. |
| 5,942,585 A | 8/1999 | Scott et al. |
| 5,954,216 A | 8/1999 | Scott et al. |
| 5,958,539 A | 9/1999 | Eckart et al. |
| 5,958,581 A | 9/1999 | Khanarian et al. |
| 5,959,066 A | 9/1999 | Charbonneau et al. |
| 5,962,625 A | 10/1999 | Yau |
| 5,977,347 A | 11/1999 | Shuto et al. |
| 5,989,663 A | 11/1999 | Morris et al. |
| 6,001,910 A | 12/1999 | Blumenthal et al. |
| 6,005,059 A | 12/1999 | Scott et al. |
| 6,011,124 A | 1/2000 | Scott et al. |
| 6,012,597 A | 1/2000 | Nishihara et al. |
| 6,022,603 A | 2/2000 | Umeda et al. |
| 6,025,061 A | 2/2000 | Khanarian et al. |
| 6,030,671 A | 2/2000 | Yang et al. |
| 6,037,424 A | 3/2000 | Scott et al. |
| 6,043,322 A | 3/2000 | Scott et al. |
| 6,044,996 A | 4/2000 | Carew et al. |
| 6,063,464 A | 5/2000 | Charbonneau et al. |
| 6,063,465 A | 5/2000 | Charbonneau et al. |
| 6,063,495 A | 5/2000 | Charbonneau et al. |
| 6,084,019 A | 7/2000 | Matayabas et al. |
| 6,096,854 A | 8/2000 | Morris et al. |
| 6,114,575 A | 9/2000 | McMahon et al. |
| 6,120,477 A | 9/2000 | Campbell et al. |
| 6,120,889 A | 9/2000 | Turner et al. |
| 6,126,992 A | 10/2000 | Khanarian et al. |
| 6,127,492 A | 10/2000 | Nagashima et al. |
| 6,146,228 A | 11/2000 | Mougin et al. |
| 6,150,494 A | 11/2000 | Wang et al. |
| 6,183,848 B1 | 2/2001 | Turner et al. |
| 6,191,209 B1 | 2/2001 | Andrews et al. |
| 6,211,309 B1 | 4/2001 | McIntosh et al. |
| 6,221,556 B1 | 4/2001 | Gallucci et al. |

(56) References Cited

U.S. PATENT DOCUMENTS

| | | |
|---|---|---|
| 6,225,436 B1 | 5/2001 | Eiffler et al. |
| 6,232,504 B1 | 5/2001 | Barteau et al. |
| 6,239,910 B1 | 5/2001 | Kim et al. |
| 6,255,523 B1 | 7/2001 | Panandiker et al. |
| 6,273,282 B1 | 8/2001 | Ogg et al. |
| 6,287,656 B1 | 9/2001 | Turner et al. |
| 6,307,006 B1 | 10/2001 | Konig et al. |
| 6,309,718 B1 | 10/2001 | Sprayberry |
| 6,320,042 B1 | 11/2001 | Michihata et al. |
| 6,323,291 B1 | 11/2001 | Mason et al. |
| 6,323,304 B1 | 11/2001 | Lemmon et al. |
| 6,342,304 B1 | 1/2002 | Buchanan et al. |
| 6,352,783 B1 | 3/2002 | Fagerburg |
| 6,354,986 B1 | 3/2002 | Hlavinka et al. |
| 6,359,070 B1 | 3/2002 | Khanarian et al. |
| 6,406,792 B1 | 6/2002 | Briquet et al. |
| 6,431,401 B1 | 6/2002 | Briquet et al. |
| 6,448,334 B1 | 9/2002 | Verhoogt et al. |
| 6,458,468 B1 | 10/2002 | Moskala et al. |
| 6,504,002 B1 | 1/2003 | Karlik et al. |
| 6,559,272 B1 | 5/2003 | Jeon et al. |
| 6,573,328 B2 | 6/2003 | Kropp et al. |
| 6,576,717 B1 | 6/2003 | Kuo et al. |
| 6,599,994 B2 | 7/2003 | Shelby et al. |
| 6,639,067 B1 | 10/2003 | Brinegar et al. |
| 6,656,577 B1 | 12/2003 | Adelman et al. |
| 6,669,980 B2 | 12/2003 | Hansen |
| 6,723,768 B2 | 4/2004 | Adams et al. |
| 6,733,716 B2 | 5/2004 | Belcher |
| 6,740,377 B2 | 5/2004 | Pecorini et al. |
| 6,740,714 B2 | 5/2004 | Pecorini et al. |
| 6,818,293 B1 | 11/2004 | Keep et al. |
| 6,818,730 B2 | 11/2004 | Brandenburg et al. |
| 6,846,440 B2 | 1/2005 | Flynn et al. |
| 6,846,508 B1 | 1/2005 | Colas et al. |
| 6,896,966 B2 | 5/2005 | Crawford et al. |
| 6,908,650 B2 | 6/2005 | Odorisio et al. |
| 6,914,120 B2 | 7/2005 | Germroth et al. |
| 7,037,576 B2 | 5/2006 | Willham et al. |
| 7,048,978 B2 | 5/2006 | Tanaka et al. |
| 7,051,892 B1 | 5/2006 | Tanaka et al. |
| 7,122,661 B2 | 10/2006 | Fleche et al. |
| 7,169,880 B2 | 1/2007 | Shelby et al. |
| 7,273,894 B2 | 9/2007 | Shelby et al. |
| 7,297,755 B2 | 11/2007 | Shelby et al. |
| 7,354,628 B2 | 4/2008 | Steube |
| 7,375,154 B2 | 5/2008 | Stafford et al. |
| 7,427,430 B2 | 9/2008 | Rhee et al. |
| 7,462,684 B2 | 12/2008 | Hale et al. |
| 7,468,409 B2 | 12/2008 | Pearson et al. |
| 7,482,397 B2 | 1/2009 | Pearson et al. |
| 7,510,768 B2 | 3/2009 | Crawford et al. |
| 7,576,171 B2 | 8/2009 | Crawford et al. |
| 7,704,605 B2 | 4/2010 | Crawford et al. |
| 7,737,246 B2 | 6/2010 | Crawford et al. |
| 7,740,941 B2 | 6/2010 | Crawford et al. |
| 7,781,562 B2 | 8/2010 | Crawford et al. |
| 7,803,439 B2 | 9/2010 | Crawford et al. |
| 7,803,440 B2 | 9/2010 | Crawford et al. |
| 7,803,441 B2 | 9/2010 | Crawford et al. |
| 7,807,774 B2 | 10/2010 | Crawford et al. |
| 7,807,775 B2 | 10/2010 | Crawford et al. |
| 7,812,111 B2 | 10/2010 | Crawford et al. |
| 7,812,112 B2 | 10/2010 | Crawford et al. |
| 7,834,129 B2 | 11/2010 | Crawford et al. |
| 7,838,620 B2 | 11/2010 | Crawford et al. |
| 7,842,776 B2 | 11/2010 | Crawford et al. |
| 7,855,267 B2 | 12/2010 | Crawford et al. |
| 7,868,128 B2 | 1/2011 | Crawford et al. |
| 7,893,187 B2 | 2/2011 | Crawford et al. |
| 7,893,188 B2 | 2/2011 | Crawford et al. |
| 7,902,320 B2 | 3/2011 | Crawford et al. |
| 7,906,211 B2 | 3/2011 | Crawford et al. |
| 7,906,212 B2 | 3/2011 | Crawford et al. |
| 7,906,610 B2 | 3/2011 | Crawford et al. |
| 7,915,376 B2 | 3/2011 | Crawford et al. |
| 7,951,900 B2 | 5/2011 | Crawford et al. |
| 7,955,674 B2 | 6/2011 | Hale et al. |
| 7,959,836 B2 | 6/2011 | Hale et al. |
| 7,959,998 B2 | 6/2011 | Hale et al. |
| 7,985,827 B2 | 7/2011 | Crawford et al. |
| 8,063,172 B2 | 11/2011 | Crawford et al. |
| 8,063,173 B2 | 11/2011 | Crawford et al. |
| 8,067,525 B2 | 11/2011 | Crawford et al. |
| 8,101,705 B2 | 1/2012 | Crawford et al. |
| 8,119,761 B2 | 2/2012 | Crawford et al. |
| 8,119,762 B2 | 2/2012 | Crawford et al. |
| 8,133,967 B2 | 3/2012 | Pecorini et al. |
| 8,193,302 B2 | 6/2012 | Crawford et al. |
| 8,198,371 B2 | 6/2012 | Stack et al. |
| 8,287,970 B2 | 10/2012 | Pecorini et al. |
| 8,299,204 B2 | 10/2012 | Germroth et al. |
| 8,354,491 B2 | 1/2013 | Crawford et al. |
| 8,415,450 B2 | 4/2013 | Crawford et al. |
| 8,501,287 B2 | 8/2013 | Pecorini et al. |
| 8,501,292 B2 | 8/2013 | Pecorini |
| 8,507,638 B2 | 8/2013 | Crawford et al. |
| 9,169,348 B2 | 10/2015 | Crawford et al. |
| 9,169,388 B2 | 10/2015 | Germroth et al. |
| 9,175,134 B2 | 11/2015 | Crawford et al. |
| 9,181,387 B2 | 11/2015 | Crawford et al. |
| 9,181,388 B2 | 11/2015 | Crawford et al. |
| 9,534,079 B2 | 1/2017 | Crawford et al. |
| 9,598,533 B2 | 3/2017 | Crawford et al. |
| 2001/0029324 A1 | 10/2001 | Walker et al. |
| 2001/0031805 A1 | 10/2001 | Buhler |
| 2001/0034419 A1 | 10/2001 | Kanayama et al. |
| 2001/0044003 A1 | 11/2001 | Galluci et al. |
| 2002/0055586 A1 | 5/2002 | Dalgewicz, III et al. |
| 2002/0128357 A1 | 9/2002 | Goossens et al. |
| 2002/0132963 A1 | 9/2002 | Quillen |
| 2002/0137856 A1 | 9/2002 | Andrews et al. |
| 2002/0188092 A1 | 12/2002 | Moskala et al. |
| 2002/0198297 A1 | 12/2002 | Odorisio et al. |
| 2003/0032737 A1 | 2/2003 | Andrews et al. |
| 2003/0060546 A1 | 3/2003 | Moskala et al. |
| 2003/0075516 A1 | 4/2003 | Rothman et al. |
| 2003/0077546 A1 | 4/2003 | Donovan et al. |
| 2003/0135015 A1 | 7/2003 | Fujimaki et al. |
| 2003/0139497 A1 | 7/2003 | Odorisio et al. |
| 2003/0149177 A1 | 8/2003 | Andrews et al. |
| 2003/0169514 A1 | 9/2003 | Bourdelais et al. |
| 2003/0187151 A1 | 10/2003 | Adams et al. |
| 2003/0195295 A1 | 10/2003 | Mahood et al. |
| 2003/0221716 A1 | 12/2003 | Olson |
| 2003/0229181 A1 | 12/2003 | Hariharan et al. |
| 2004/0022526 A1 | 2/2004 | Kuno et al. |
| 2004/0056053 A1 | 3/2004 | Hollander et al. |
| 2004/0063864 A1 | 4/2004 | Adams et al. |
| 2004/0101687 A1 | 5/2004 | Crawford et al. |
| 2004/0106707 A1 | 6/2004 | Su et al. |
| 2004/0106767 A1 | 6/2004 | Simon et al. |
| 2004/0108623 A1 | 6/2004 | Deeter et al. |
| 2004/0138381 A1 | 7/2004 | Blasius et al. |
| 2004/0145700 A1 | 7/2004 | Miniutti et al. |
| 2004/0164279 A1 | 8/2004 | Stevenson et al. |
| 2004/0202822 A1 | 10/2004 | Bourdelais et al. |
| 2004/0214984 A1 | 10/2004 | Keep et al. |
| 2005/0008885 A1 | 1/2005 | Blakely et al. |
| 2005/0072060 A1 | 4/2005 | Moncho et al. |
| 2005/0096453 A1 | 5/2005 | Flynn et al. |
| 2005/0101759 A1 | 5/2005 | Odorisio et al. |
| 2005/0113556 A1 | 5/2005 | Strand et al. |
| 2005/0119359 A1 | 6/2005 | Shelby et al. |
| 2005/0124779 A1 | 6/2005 | Shelby et al. |
| 2005/0181155 A1 | 8/2005 | Share et al. |
| 2006/0004151 A1 | 1/2006 | Shaikh et al. |
| 2006/0036012 A1 | 2/2006 | Hayes et al. |
| 2006/0094858 A1 | 5/2006 | Turner et al. |
| 2006/0111481 A1 | 5/2006 | Pearson et al. |
| 2006/0111519 A1 | 5/2006 | Strand et al. |
| 2006/0135668 A1 | 6/2006 | Hayes |
| 2006/0146228 A1 | 7/2006 | Sogo et al. |
| 2006/0151907 A1 | 7/2006 | Kashiwabara |

(56) References Cited

U.S. PATENT DOCUMENTS

| | | |
|---|---|---|
| 2006/0180560 A1 | 8/2006 | Robinson |
| 2006/0197246 A1 | 9/2006 | Hale et al. |
| 2006/0199904 A1 | 9/2006 | Hale et al. |
| 2006/0199919 A1 | 9/2006 | Hale et al. |
| 2006/0226565 A1 | 10/2006 | Hale et al. |
| 2006/0228507 A1 | 10/2006 | Hale et al. |
| 2006/0234073 A1 | 10/2006 | Hale et al. |
| 2006/0235167 A1 | 10/2006 | Hale et al. |
| 2006/0247388 A1 | 11/2006 | Hale et al. |
| 2006/0270773 A1 | 11/2006 | Hale et al. |
| 2006/0270806 A1 | 11/2006 | Hale et al. |
| 2006/0286322 A1 | 12/2006 | Crawford et al. |
| 2006/0286326 A1 | 12/2006 | Crawford et al. |
| 2006/0286327 A1 | 12/2006 | Crawford et al. |
| 2006/0286328 A1 | 12/2006 | Crawford et al. |
| 2006/0286329 A1 | 12/2006 | Crawford et al. |
| 2006/0286330 A1 | 12/2006 | Crawford et al. |
| 2006/0286331 A1 | 12/2006 | Crawford et al. |
| 2006/0286384 A1 | 12/2006 | Crawford et al. |
| 2006/0286389 A1 | 12/2006 | Crawford et al. |
| 2006/0286394 A1 | 12/2006 | Crawford et al. |
| 2006/0287474 A1 | 12/2006 | Crawford et al. |
| 2006/0287476 A1 | 12/2006 | Crawford et al. |
| 2006/0287477 A1 | 12/2006 | Crawford et al. |
| 2006/0287478 A1 | 12/2006 | Crawford |
| 2006/0287479 A1 | 12/2006 | Crawford et al. |
| 2006/0287480 A1 | 12/2006 | Crawford et al. |
| 2006/0287481 A1 | 12/2006 | Crawford |
| 2006/0287483 A1 | 12/2006 | Crawford et al. |
| 2006/0287484 A1 | 12/2006 | Crawford et al. |
| 2006/0287485 A1 | 12/2006 | Crawford et al. |
| 2006/0287486 A1 | 12/2006 | Crawford et al. |
| 2006/0287487 A1 | 12/2006 | Crawford et al. |
| 2006/0287488 A1 | 12/2006 | Crawford et al. |
| 2006/0287489 A1 | 12/2006 | Crawford et al. |
| 2006/0287490 A1 | 12/2006 | Crawford et al. |
| 2006/0287491 A1 | 12/2006 | Crawford et al. |
| 2006/0287492 A1 | 12/2006 | Crawford et al. |
| 2006/0287493 A1 | 12/2006 | Crawford et al. |
| 2006/0287494 A1 | 12/2006 | Crawford |
| 2006/0287495 A1 | 12/2006 | Crawford et al. |
| 2006/0287496 A1 | 12/2006 | Crawford et al. |
| 2006/0293494 A1 | 12/2006 | Crawford et al. |
| 2006/0293495 A1 | 12/2006 | Crawford et al. |
| 2007/0010649 A1 | 1/2007 | Crawford et al. |
| 2007/0016050 A1 | 1/2007 | Crawford et al. |
| 2007/0071930 A1 | 3/2007 | Shelby et al. |
| 2007/0100122 A1 | 5/2007 | Crawford et al. |
| 2007/0100125 A1 | 5/2007 | Crawford et al. |
| 2007/0105993 A1 | 5/2007 | Germroth et al. |
| 2007/0106054 A1 | 5/2007 | Crawford et al. |
| 2007/0129531 A1 | 6/2007 | Crawford et al. |
| 2007/0142511 A1 | 6/2007 | Crawford et al. |
| 2007/0142615 A1 | 6/2007 | Crawford et al. |
| 2007/0232778 A1 | 10/2007 | Moody et al. |
| 2007/0232779 A1 | 10/2007 | Moody et al. |
| 2007/0270569 A1 | 11/2007 | Crawford et al. |
| 2008/0092776 A1 | 4/2008 | Stockl et al. |
| 2008/0293857 A1 | 11/2008 | Crawford et al. |
| 2008/0293882 A1 | 11/2008 | Germroth et al. |
| 2009/0093573 A1 | 4/2009 | Germroth et al. |
| 2009/0093574 A1 | 5/2009 | Crawford et al. |
| 2009/0130353 A1 | 5/2009 | Pecorini et al. |
| 2009/0137723 A1 | 5/2009 | Crawford et al. |
| 2009/0137735 A1 | 5/2009 | Crawford et al. |
| 2010/0087574 A1 | 4/2010 | Crawford et al. |
| 2010/0092705 A1 | 4/2010 | Crawford et al. |
| 2010/0096589 A1 | 4/2010 | Crawford et al. |
| 2010/0099828 A1 | 4/2010 | Stack et al. |
| 2010/0120979 A1 | 5/2010 | Crawford et al. |
| 2010/0159176 A1 | 6/2010 | Hale et al. |
| 2010/0174030 A1 | 7/2010 | Crawford et al. |
| 2010/0174033 A1 | 7/2010 | Crawford et al. |
| 2010/0174034 A1 | 7/2010 | Crawford et al. |
| 2010/0184940 A1 | 7/2010 | Germroth et al. |
| 2010/0204413 A1 | 8/2010 | Powell et al. |
| 2010/0227971 A1* | 9/2010 | Crawford ............ A01G 9/1438 524/605 |
| 2010/0249293 A1 | 9/2010 | Treece et al. |
| 2010/0252570 A1 | 9/2010 | Treece et al. |
| 2010/0298523 A1 | 11/2010 | Germroth et al. |
| 2010/0300918 A1 | 12/2010 | Crawford et al. |
| 2010/0301524 A1 | 12/2010 | Crawford et al. |
| 2011/0017751 A1 | 1/2011 | Pecorini et al. |
| 2011/0042338 A1 | 2/2011 | Pecorini et al. |
| 2011/0054091 A1 | 3/2011 | Crawford et al. |
| 2011/0144266 A1 | 6/2011 | Crawford et al. |
| 2011/0189415 A1 | 8/2011 | Crawford et al. |
| 2011/0306730 A1 | 12/2011 | Crawford et al. |
| 2012/0021158 A1 | 1/2012 | Crawford et al. |
| 2012/0108715 A1 | 5/2012 | Crawford et al. |
| 2012/0184668 A1 | 7/2012 | Stack et al. |
| 2012/0184669 A1 | 7/2012 | Hale et al. |
| 2012/0184687 A1 | 7/2012 | Hale et al. |
| 2012/0318767 A1 | 12/2012 | Burgess et al. |
| 2012/0322951 A1 | 12/2012 | Hale et al. |
| 2012/0328815 A1 | 12/2012 | Pecorini et al. |
| 2013/0072628 A1 | 3/2013 | Crawford et al. |
| 2013/0217830 A1 | 8/2013 | Crawford et al. |
| 2016/0009857 A1 | 1/2016 | Crawford et al. |
| 2016/0009951 A1 | 1/2016 | Crawford et al. |
| 2016/0017125 A1 | 1/2016 | Germroth et al. |

FOREIGN PATENT DOCUMENTS

| | | |
|---|---|---|
| CN | 101193935 A | 6/2008 |
| DE | 29 21 868 A1 | 12/1980 |
| DE | 197 27 709 | 6/1997 |
| DE | 198 11 773 A1 | 9/1999 |
| EP | 0 039 838 A1 | 11/1981 |
| EP | 0 273 144 | 5/1987 |
| EP | 0 282 277 | 9/1988 |
| EP | 0 372 846 | 6/1990 |
| EP | 0 544 008 A1 | 6/1993 |
| EP | 0 595 413 A1 | 5/1994 |
| EP | 0 698 631 | 2/1996 |
| EP | 0 714 764 A2 | 6/1996 |
| EP | 0 902 052 A1 | 3/1999 |
| EP | 0 930 531 A1 | 7/1999 |
| EP | 1 035 167 A | 9/2000 |
| EP | 1 066 825 A1 | 1/2001 |
| EP | 1 674 496 A1 | 6/2006 |
| EP | 1 705 124 A1 | 6/2006 |
| EP | 2168752 A2 | 3/2010 |
| EP | 2 332 592 | 6/2011 |
| FR | 1291273 | 5/1965 |
| FR | 1432471 | 2/1966 |
| FR | 1434658 | 2/1966 |
| FR | 2112400 | 6/1972 |
| GB | 962913 | 7/1964 |
| GB | 1041651 | 9/1966 |
| GB | 1044015 | 9/1966 |
| GB | 1047043 | 11/1966 |
| GB | 1090241 | 11/1967 |
| GB | 1130558 | 10/1968 |
| GB | 1278284 | 6/1972 |
| GB | 1364732 | 8/1974 |
| GB | 2216919 A | 10/1989 |
| JP | 56-88440 A | 12/1979 |
| JP | 03207743 | 9/1991 |
| JP | 65-01040 | 2/1994 |
| JP | 9-59371 A | 4/1997 |
| JP | 11-222516 | 8/1999 |
| JP | 2001-066701 | 8/1999 |
| JP | 2000-352620 A | 12/2000 |
| JP | 2001-098086 | 4/2001 |
| JP | 2001-214049 | 8/2001 |
| JP | 2002-059913 A | 2/2002 |
| JP | 2004-058565 A | 2/2004 |
| JP | 2004-066624 A | 2/2004 |
| JP | 2004-244497 A | 3/2004 |
| JP | 2004-292558 A | 10/2004 |
| JP | 2005-254757 A | 9/2005 |
| JP | 2007-069914 A | 3/2007 |

(56) References Cited

FOREIGN PATENT DOCUMENTS

| | | |
|---|---|---|
| JP | 2007-253491 A | 10/2007 |
| KR | 2001-089942 | 10/2001 |
| KR | 2003-054611 | 7/2003 |
| WO | WO 93/06018 A1 | 4/1993 |
| WO | WO 01-06981 | 1/1997 |
| WO | WO 01-85824 A2 | 2/2001 |
| WO | WO 02-055570 A1 | 11/2001 |
| WO | WO 02-059207 | 7/2002 |
| WO | WO2004-009146 A1 | 8/2002 |
| WO | WO 88/04279 | 7/2003 |
| WO | WO 2004-039860 | 1/2004 |
| WO | WO 2004-104077 A1 | 5/2004 |
| WO | WO 2004-106988 A2 | 12/2004 |
| WO | WO 2005-007735 A2 | 12/2004 |
| WO | WO 2005-026241 A1 | 1/2005 |
| WO | WO 2005/110874 A1 | 3/2005 |
| WO | WO 2006-127755 A2 | 3/2006 |
| WO | WO 2006-127831 A1 | 11/2006 |
| WO | WO 2007-053434 A1 | 11/2006 |
| WO | WO 2007/001551 A1 | 1/2007 |
| WO | WO 2007/001552 A1 | 1/2007 |
| WO | WO 2007-053548 A2 | 5/2007 |
| WO | WO 2007-053549 A1 | 5/2007 |
| WO | WO 2007-053550 | 5/2007 |
| WO | WO 2009/130033 | 5/2007 |
| WO | WO 2007-123631 | 11/2007 |
| WO | WO 2009/070238 A2 | 4/2010 |

OTHER PUBLICATIONS

Scheirs, John, et al., "Modern Polyesters: Chemistry and Technology of Polyesters and Copolyesters," Technology & Engineering, 2003, p. 287.
English language Abstract of JP 02-305816 from Patent Abstracts of Japan, Dec. 19, 1990.
English language translation of Belgian Patent No. BE 615,850, Apr. 13, 1962.
English language translation of French Patent No. FR 1,432,471, Feb. 7, 1966.
English language translation of French Patent No. FR 1,434,658, Feb. 28, 1966.
Chapter 4—*Processing of Plastics in "Plastics Engineering, 3rd ed "*, R.J. Crawford, Butterworth-Heinemann Publisher, 1998, Oxford, England, pp. 245-342.
Fox equation (T.G. Fox, Session J, Bull. Am. Phys. Soc., 1, 123 (1956)).
*The Technology of Plasticizers*, by J. Kern Sears and Joseph R Darby, published by Society of Plastic Engineers—Wiley and Sons, New York, 1982; pp. 136-139.
Coleman et al., "Polymer Reviews—A Practical Guide to Polymer Miscibility," *Polymer 31*, pp. 1187-1203 (1990).
"*Hansen Solubility Parameters, a Users Handbook*", by Charles M. Hansen, Chapter 1, CRC Press, 2000, pp. 1-24.
Martinez et al., "*Phase Behavior and Mechanical Properties of Injection Molded Poly (Ethylene Terephthalate)—Polyarylate Blends*"; Journal of Applied Polymer Science, John Wiley and Sons Inc. New York, US, vol. 45, No. 7, Jul. 5, 1992 (Jul. 5, 1992), p. 1135-1143.
Won Ho Jo et al. : :*Miscibility of poly(ether imide)-poly(ethylene terephthalate) blends*; Polymer Bulletin, Springer, Heidelberg, DE, vol. 33, No. 1, Jun. 1, 1994 (Jun. 1, 1994), pp. 113-118 (1994).
Anonymous: "*Poly (ethylene naphthalenedicarboxylate)-polyetherimide blends*" Research Disclosure, Mason Publications, Hampshire, GB, vol. 283, No. 38, Nov. 1987 (Nov. 1987).
ASTM D1525-06, *Standard Test Method for Vicat Softening Temperature of Plastics*, Mar. 15, 2006.
ASTM D648-06, *Standard Test Method for Deflection Temperature of Plastics Under Flexural Load in the Edgewise Position*, Mar. 15, 2006.
ASTM D256-06, *Standard Test Methods for Determining the Izod Pendulum Impact Resistance of Plastics*, Mar. 15, 2006.
ASTM D790-03, *Standard Test Methods for Flexural Properties of Unreinforced and Reinforced Plastics and Electrical Insulating Materials*, Mar. 10, 2003.
ASTM D638-03, *Standard Test Method for Tensile Properties of Plastics*, Dec. 1, 2003.
ASTM D3418-03, *Transition Temperatures and Enthalpies of Fusion and Crystallization of Polymers by Differential Scanning Calorimetry*, Dec. 1, 2003.
Color Index Constitution No. 515240, SciFinder, Nov. 6, 2006.
Color Index Constitution No. 515245, SciFinder, Nov. 6, 2006.
Database WPI, Section Ch, Week 200536, Derwent Publications Ltd., London, GB; AN 2005-355258, XP002396922 & WO 2005-030833 A1 (Kanebo Ltd) Apr. 7, 2005 (Apr. 7, 2005) abstract.
Shearer, N.H., "T18-Type 1 Polyesters," Mar. 1966, SPE Annual Technical Conference and Exhibition, XP009080224.
Gachter, Muller, "Taschenbuch der Kunststoff-Additive," 1990, Carl Hanser Verlag Munchen Wien, XP02450422, pp. 96-97.
Gachter, Muller, "Kunstoff-Additive," 1990, Carl Hanser Verlag Munchen Wien, XP 02449987, pp. 96-99.
Brown, R., "Taschenbuch Kunstoff-Additive", 1990, Carl Hanswer Verlag Munchen Wiel, XP002455247, pp. 361-363.
Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.
Dixon, E.R. et al., "The Inter-Relation of Some Mechanical Properties with Molecular Weight and Crystallinity in Poly(ethylene terephthalate)", 1968, pp. 464-470, Journal of Materials Science, vol. 3.
Ellis, Thomas S., "Miscibility of Polyamide Blends: Effects of Configuration," 1995, Polymer, vol. 36, Issue 20, pp. 3919-3926.
Buschow, K.H.J., et al., "Packaging: Papers for Sacks and Bags," 2001, Encyclopedia of Materials: Science and Technology, vol. 8, Elsevier, pp. 6646-6652.
Coles, Richard, et al., "Food Packaging Technology," 2003, pp. 194-195 and 224-229, Blackwell Publishing.
Sajiki, Junko, et al., "Leaching of Bisphenol A (BPA) to Seawater from Polycarbonate Plastic and its Degradation by Reactive Oxygen Species," 2003, Chemosphere, 51, pp. 55-62.
Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.
Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.
Zipper, Marcus D.,et al., "A Free Volume Study of Miscible Polyester Blends," 1995, pp. 127-136, Polymer, vol. 36.
"APEC High-Heat Polycarbonate Resin," 2004, Bayer Material Science Product Information Not Prior Art; Submitted for State of the Art.
Lobo, Hubert et al, "Handbook of Plastics Analysis," 2003, pp. 20 and 21, Marcel Dekker, Inc.
Turner, S.R., et al. "Amorphous and Crystalline Polyesters based on 1,4-Cyclohexanedimethanol," 2003, *Modern Polyesters: Chemistry and Technology of Polyesters and Copolyesters*, pp. 268, 284-285, J. Sheirs and T.E. Long, ed., John Wiley and Sons, Ltd.
Al-Malaika, S., "Stabilization", Encyclopedia of Polymer Science and Technology, vol. 4, 2001, pp. 179-229, John Wiley & Sons, Inc.
News Release by Eastman on May 13, 2010 on its web site [News Release]: http://www.eastman.com/Company/News_Center/2010?Pages/Greif_Packaging_Introduces_Reusable_Home_Office_Water_Bottles_Made_With_Eastman_Tritan_Copolyester.aspx.

* cited by examiner

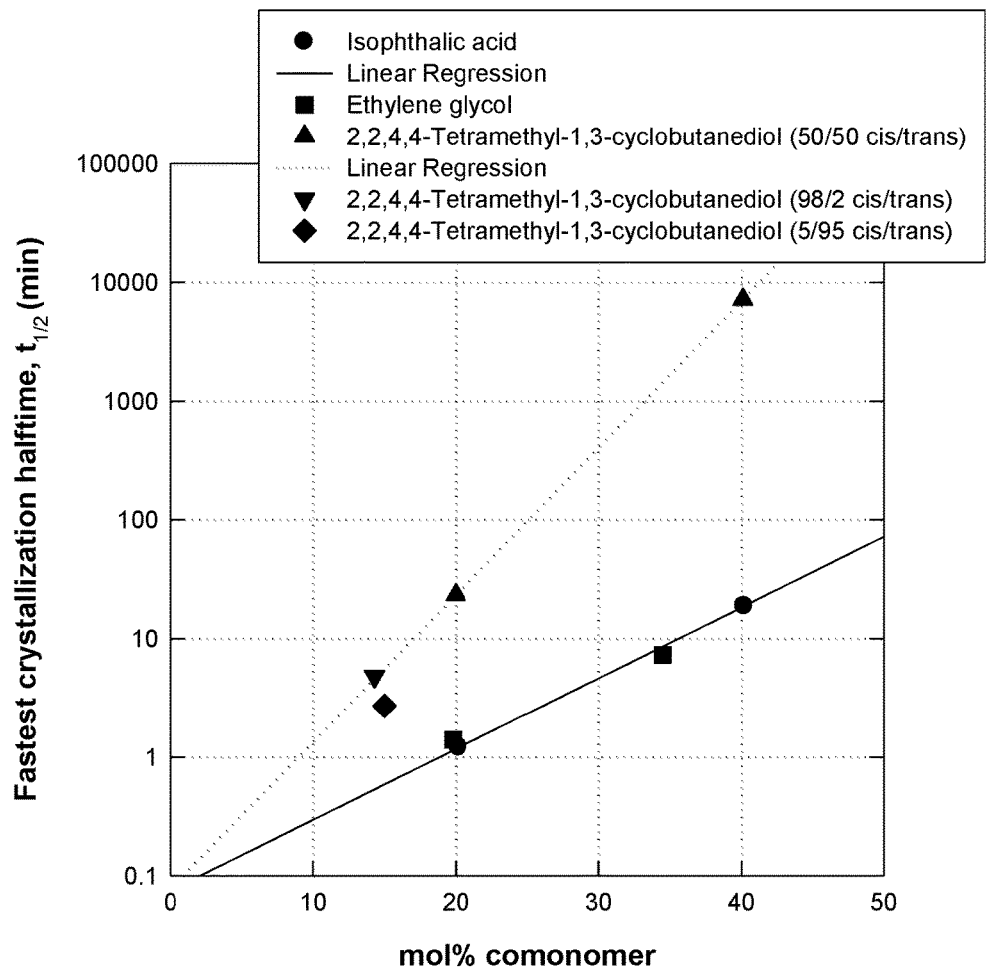
Figure 1: The effect of comonomer on the fastest crystallization halftimes of modified PCT copolyesters

CLEAR SEMI-CRYSTALLINE ARTICLES WITH IMPROVED HEAT RESISTANCE

FIELD OF THE INVENTION

The present invention generally relates to clear semi-crystalline articles made from polyesters comprising terephthalic acid, or an ester thereof, or mixtures thereof; 1 to 15 mole % 2,2,4,4-tetramethyl-1,3-cyclobutanediol residues and 85 to 99 mole % 1,4-cyclohexanedimethanol residues. These polyesters have a surprising combination of a certain crystallization rate along with a certain melting temperatures (Tm) and certain glass transition temperatures (Tg). These polyesters are useful in preparing clear semi-crystalline articles with improved heat resistance by strain induced crystallization processes known in the art.

BACKGROUND OF THE INVENTION

To date, copolyester compositions comprising terephthalic acid or an ester thereof or mixtures thereof, 2,2,4,4-tetramethyl-1,3-cyclobutanediol (TMCD) residues and 1,4-cyclohexanedimethanol (CHDM) residues have been focused primarily for use in the injection molding and extrusion of amorphous articles even in relatively thick parts due to slow crystallization rates. These slow crystallization rates are achieved by modifying the polyester (PCT), which is based on terephthalic acid (TPA) or ester thereof such as dimethyl terephthalate (DMT), or mixture thereof, and CHDM (70/30 trans/cis) with TMCD at levels greater than 20 mole percent of the diol fraction.

On the other hand, unmodified PCT is known to crystallize extremely fast making it extremely difficult to mold or extrude even thin parts without thermal crystallization. Thermal crystallization of PCT and other polyesters typically leads to opacity in parts.

In order to slow down the crystallization rate of PCT, additional dicarboxylic acids or glycols can be used to modify PCT in order to slow down the crystallization rate. In particular, ethylene glycol or isophthalic acid-modified PCTs are known in the art and are commercially available. Polyethylene terephthalate (PET) or slightly modified PET's have been proven useful in clear semi-crystalline articles such as soft drink bottles, oriented films, and oriented fibers. These articles from PET are prepared by processes that take advantage of PET's ability to strain induce crystallize above Tg from an amorphous state. These PETs have slower thermal crystallization rates than unmodified PCT allowing them to be used in such processes.

In order to achieve similar crystallization rates to PET, PCT has to be modified with certain levels, approximately 15 to 30 mole % of the diol fraction coming from ethylene glycol or 15 to 30 mole % of the acid fraction coming from isophthalic acid. This results in modified PCT materials with melting temperatures (Tm) and glass transition temperatures (Tg) similar to PET (Tm=~240° C., Tg=~80° C.). Given the similar Tm and Tg to PET, these modified PCT materials provide little benefit in terms of heat resistance compared to PET and are typically more costly to produce.

Thus, there is a need in the art for a modification of PCT that slows down the thermal crystallization rate enough, similar to PET, to permit the molding of amorphous articles and extrusion of amorphous films that can be subsequently strain induced crystallized by orientation processes known in the art such as fiber drawing, film stretching, stretch blow molding, injection stretch blow molding and the like, to produce clear semi-crystalline articles with superior heat resistance (higher Tg and higher Tm) to clear semi-crystalline articles from PCT modified by ethylene glycol or isophthalic acid or PET.

SUMMARY OF THE INVENTION

We have surprisingly found a range of TMCD modification of PCT that slows down the crystallization rate enough to permit the molding of articles and extrusion of films without thermal crystallization occurring yet still allows for strain induced crystallinity to occur above Tg in various orientation based processes allowing for production of clear semi-crystalline articles with improved heat resistance compared to PCT modified by ethylene glycol or isophthalic acid and PET.

In one aspect, the invention relates to a clear, semi-crystalline article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.

In one aspect, the invention relates to a clear, semi-crystalline, oriented article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.

In one aspect, the invention relates to a clear, semi-crystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C.

In one aspect, the invention relates to a clear, semi-crystalline article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semi-crystalline, oriented article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear semi-crystalline, oriented article produced by strain induced crystallization processes comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semi-crystalline article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semi-crystalline, oriented article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear semi-crystalline, oriented article produced by strain induced crystallization processes comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds. In one aspect, the invention relates to a clear, semi-crystalline article comprising at least one polyester which comprises:
(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semi-crystalline, oriented article comprising at least one polyester which comprises:
(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear semi-crystalline, oriented article produced by strain induced crystallization processes comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semi-crystalline article comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semi-crystalline, oriented article comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear semi-crystalline, oriented article produced by strain induced crystallization processes comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semi-crystalline, strain induced crystallized article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.

In one aspect, the invention relates to a clear, semi-crystalline, strain induced crystallized, oriented article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.

In one aspect, the invention relates to a clear semi-crystalline, strain induced crystallized, oriented article produced by strain induced crystallization processes comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C.

In one aspect, the invention relates to a clear, semi-crystalline, strain induced crystallized article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semicrystalline, strain induced crystallized, oriented article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear semicrystalline, oriented article produced by strain induced crystallization processes comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semicrystalline, strain induced crystallized article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semicrystalline, strain induced crystallized, oriented article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear semicrystalline, strain induced crystallized, oriented article produced by strain induced crystallization processes comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semicrystalline article comprising at least one polyester which comprises:
(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semicrystalline, oriented, strain induced crystallized article comprising at least one polyester which comprises:
(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear semi-crystalline, oriented article produced by strain induced crystallization processes comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes.

In one aspect, the invention relates to a clear, semi-crystalline, strain induced crystallized article comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semi-crystalline, oriented, strain induced crystallized article comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear semi-crystalline, oriented article produced by strain induced crystallization processes comprising at least one polyester which comprises:

(a) a dicarboxylic acid component comprising:
   i) 70 to 100 mole % of terephthalic acid residues;
(b) a glycol component comprising:
   i) 5 to 15 mole % of 2,2,4,4-tetramethyl-1,3-cyclobutanediol residues; and
   ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds.

In one aspect, the invention relates to a clear, semi-crystalline article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and
   wherein said article has a strain induced crystallinity of greater than zero when stretched at a temperature above the Tg of the polyester.

In one aspect, the invention relates to a clear, semi-crystalline article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and
   wherein said article has a strain induced crystallinity of greater than zero to 50 when stretched at a temperature above the Tg of the polyester.

In one aspect, the invention relates to a clear, semi-crystalline article comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and wherein said article has a strain induced crystallinity of from 5% to 50% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and wherein said article has a strain induced crystallinity of from 5% to 45% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and wherein said article has a strain induced crystallinity of from 5% to 40% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and wherein said article has a strain induced crystallinity of from 8% to 35% when stretched at a temperature above the Tg of the polyester.

In one aspect, the invention relates to a clear, semicrystalline, oriented article comprising at least one polyester which comprises:

(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.;

wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C.;

wherein said article has a strain induced crystallinity of from 8% to 35% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes;

wherein said article has a strain induced crystallinity of from 8% to 35% when stretched at a temperature above the Tg of the polyester.

In one aspect, the invention relates to a clear, semicrystalline, oriented article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and wherein said article has a strain induced crystallinity of from 8% to 35% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and wherein said article has a strain induced crystallinity of from 8% to 35% when stretched at a temperature above the Tg of the polyester.

In one aspect, the invention relates to a clear, semicrystalline, oriented article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and wherein said article has a strain induced crystallinity of from 8% to 35% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and wherein said article has a strain induced crystallinity of from 8% to 35% when stretched at a temperature above the Tg of the polyester.

In one aspect, the invention relates to a clear, semicrystalline, oriented article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and
wherein said article has a strain induced crystallinity of from 8% to 35% when stretched at a temperature 10° C. above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear, semicrystalline, oriented article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues,
  wherein the total mole % of the dicarboxylic acid component is 100 mole %, and the total mole % of the glycol component is 100 mole %;
  wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear, semicrystalline, strain induced crystallized article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and
wherein said article has a strain induced crystallinity of from 8% to 35% when stretched at a temperature above the Tg of the polyester.

In one aspect, the invention relates to a clear, semicrystalline, strain induced crystallized, oriented article comprising at least one polyester which comprises:
(a) a dicarboxylic acid component comprising:
  i) 70 to 100 mole % of terephthalic acid residues;
(b) a glycol component comprising:
  i) 1 to 15 mole % of 2,2,4,4-tetramethyl-1,3-cyclobutanediol residues; and
  ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C.; and
wherein said article has a strain induced crystallinity of from 8% to 35% when stretched at a temperature above the Tg of the polyester.

In one aspect, the invention relates to a clear semicrystalline, strain induced crystallized, oriented article produced by strain induced crystallization processes comprising at least one polyester which comprises:

(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C.; and
wherein said article has a strain induced crystallinity of from 8% to 35% when stretched at a temperature above the Tg of the polyester.

In one aspect, the invention relates to a clear, semi-crystalline, strain induced crystallized article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and
wherein said article has a strain induced crystallinity of from 8% to 35% when stretched at a temperature above the Tg of the polyester.

In one aspect, the invention relates to a clear, semi-crystalline, strain induced crystallized, oriented article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and
wherein said article has a strain induced crystallinity of from 8% to 35% when stretched at a temperature above the Tg of the polyester.

In one aspect, the invention relates to a clear semi-crystalline, oriented article produced by strain induced crystallization processes comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and
wherein said article has a strain induced crystallinity of from 8% to 35% when stretched at a temperature above the Tg of the polyester.

In one aspect, the invention relates to a clear, semi-crystalline, strain induced crystallized article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear, semi-crystalline, strain induced crystallized, oriented article comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear semi-crystalline, strain induced crystallized, oriented article produced by strain induced crystallization processes comprising at least one polyester which comprises:
(a) a dicarboxylic acid component comprising:
   i) 70 to 100 mole % of terephthalic acid residues;
(b) a glycol component comprising:
   i) 1 to 15 mole % of 2,2,4,4-tetramethyl-1,3-cyclobutanediol residues; and
   ii) 85 to 99 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and wherein said article has a strain induced crystallinity of from 8% to 35% when stretched at a temperature above the Tg of the polyester.

In one aspect, the invention relates to a clear, semicrystalline article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and
wherein said article has a strain induced crystallinity of from 8% to 35% when stretched at a temperature above the Tg of the polyester.

In one aspect, the invention relates to a clear, semicrystalline, oriented, strain induced crystallized article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes; and
wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear, semicrystalline, strain induced crystallized article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear, semicrystalline, oriented, strain induced crystallized article comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.2 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect, the invention relates to a clear semicrystalline, oriented article produced by strain induced crystallization processes comprising at least one polyester which comprises:
(a) a dicarboxylic acid component comprising:
  i) 70 to 100 mole % of terephthalic acid residues;
(b) a glycol component comprising:
  i) 5 to 15 mole % of 2,2,4,4-tetramethyl-1,3-cyclobutanediol residues; and
  ii) 85 to 95 mole % of 1,4-cyclohexanedimethanol residues, wherein the total mole % of the dicarboxylic acid component is 100 mole %, and the total mole % of the glycol component is 100 mole %; and wherein the inherent viscosity is 0.35 to 1.0 dL/g as determined in 60/40 (wt/wt) phenol/tetrachloroethane at a concentration of 0.5 g/100 ml at 25° C.; and wherein the polyester has a Tg of 90° C. to 115° C. and a crystallization half-time of less than 10 minutes but greater than about 30 seconds; and
wherein said article has a strain induced crystallinity of from 8% to 35% when stretched at a temperature above the Tg of the polyester.

In one aspect of the invention, the articles of the invention have a strain induced crystallinity of greater than zero when stretched at a temperature above the Tg of the polyester.

In one aspect of the invention, the articles of the invention have a strain induced crystallinity of from 5% to 50% when stretched at a temperature above the Tg of the polyester.

In one aspect of the invention, the articles of the invention have a strain induced crystallinity of from 5% to 45% when stretched at a temperature above the Tg of the polyester.

In one aspect of the invention, the articles of the invention have a strain induced crystallinity of from 5% to 40% when stretched at a temperature above the Tg of the polyester.

In one aspect of the invention, the articles of the invention have a strain induced crystallinity of from 5% to 35% when stretched at a temperature above the Tg of the polyester.

In one aspect of the invention, the articles of the invention have a strain induced crystallinity of greater than zero when stretched at a temperature 10° C. above the Tg of the polyester.

In one aspect of the invention, the articles of the invention have a strain induced crystallinity of from 5% to 50% when stretched at a temperature 10° C. above the Tg of the polyester.

In one aspect of the invention, the articles of the invention have a strain induced crystallinity of from 5% to 45% when stretched at a temperature 10° C. above the Tg of the polyester.

In one aspect of the invention, the articles of the invention have a strain induced crystallinity of from 5% to 40% when stretched at a temperature 10° C. above the Tg of the polyester.

In one aspect of the invention, the articles of the invention have a strain induced crystallinity of from 5% to 35% when stretched at a temperature 10° C. above the Tg of the polyester.

In one aspect of the invention, the articles of the invention have a strain induced crystallinity of greater than zero when stretched at a temperature 20° C. above the Tg of the polyester.

In one aspect of the invention, the articles of the invention have a strain induced crystallinity of from 5% to 50% when stretched at a temperature 20° C. above the Tg of the polyester.

In one aspect of the invention, the articles of the invention have a strain induced crystallinity of from 5% to 45% when stretched at a temperature 20° C. above the Tg of the polyester.

In one aspect of the invention, the articles of the invention have a strain induced crystallinity of from 5% to 40% when stretched at a temperature 20° C. above the Tg of the polyester.

In one aspect of the invention, the articles of the invention have a strain induced crystallinity of from 5% to 35% when stretched at a temperature 20° C. above the Tg of the polyester.

In one aspect of the invention, the articles of the invention have a strain induced crystallinity of from 8% to 35% when stretched at a temperature 10° C. above the Tg of the polyester.

In one aspect of the invention, the article of the invention has a strain induced crystallinity of from 8% to 35% when stretched at a temperature 20° C. above the Tg of the polyester.

In one aspect of the invention, the article of the invention has a strain induced crystallinity of from 10% to 35% when stretched at a temperature 10° C. above the Tg of the polyester.

In one aspect of the invention, the article of the invention has a strain induced crystallinity of from 10% to 35% when stretched at a temperature 20° C. above the Tg of the polyester.

In one aspect of the invention, the article of the invention has a strain induced crystallinity of from 10% to 30% when stretched at a temperature 10° C. above the Tg of the polyester.

In one aspect of the invention, the article of the invention has a strain induced crystallinity of from 10% to 30% when stretched at a temperature 20° C. above the Tg of the polyester.

In one aspect, the clear semi-crystalline article can comprise the polyester of the invention having a crystallization half-time of less than 10 minutes but greater than about 30 seconds.

In another aspect, the clear semi-crystalline article of the invention can comprise the polyester of the invention having a melting temperature (Tm) from 260° C. to 300° C.

In another aspect, the clear semi-crystalline article of the invention can comprise the polyester of the invention having a glass transition temperature (Tg) from 90° C. to 115° C.

In another aspect, the clear semi-crystalline article of the invention can comprise the polyester of the invention having a fastest crystallization half-time of less than 10 minutes but greater than about 30 seconds.

In another aspect, the clear semi-crystalline article of the invention can comprise the polyester of the invention having a fastest crystallization half-time of less than 10 minutes but greater than about 30 seconds and a melting temperature from 260° C. to 300° C.

In another aspect, the clear semi-crystalline article of the invention can comprise the polyester of the invention having a fastest crystallization half-time of less than 10 minutes but greater than about 30 seconds and a glass transition temperature from 90° C. to 115° C.

In another aspect, the clear semi-crystalline article of the invention can comprise the polyester of the invention having a fastest crystallization half-time of less than 10 minutes but greater than about 30 seconds, a glass transition temperature from 90° C. to 115° C., and a melting temperature from 260° C. to 300° C.

In one aspect, the polyesters useful in the invention contain no branching agent or, alternatively, at least one branching agent is added either prior to or during polymerization of the polyester.

In one aspect, the polyesters useful in the invention contain at least one branching agent without regard to the method or sequence in which it is added.

In one aspect, the polyester compositions are useful in clear semi-crystalline articles of manufacture, prepared by orientation processes known in the industry, including but not limited to, blown bottles, oriented films and oriented fibers.

BRIEF DESCRIPTION OF THE DRAWINGS

FIG. 1 depicts the effect of comonomer on the fastest crystallization half-times of copolyesters containing terephthalic acid, cyclohexanedimethanol and another monomer (modified PCT copolyesters)

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. The term "glycol" as used in this application includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. Furthermore, as used in this application, the term "diacid" includes multifunctional acids, for example, branching agents. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compounds) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues. In another example, a polyester containing 15 mole % 2,2,4,4-tetramethyl-1,3-cyclobutanediol, based on the total diol residues, means the polyester contains 15 mole % 2,2,4,4-tetramethyl-1,3-cyclobutanediol residues out of a total of 100 mole % diol residues. Thus, there are 15 moles of 2,2,4,4-tetramethyl-1,3-cyclobutanediol residues among every 100 moles of diol residues.

In other aspects of the invention, the Tg of the polyesters useful in the invention can be at least one of the following ranges: 90 to 115° C.; 90 to 110° C.; 90 to 105° C.; 90 to 100° C.; 90 to 95° C.; 95 to 115° C.; 95 to 110° C.; 95 to 105° C.; 95 to 100° C.; 100 to 115° C.; 100 to 110° C.; 100 to 105° C.; 105 to 115° C.; 105 to 110° C.; and 110 to 115° C.

In other aspects of the invention, the glycol component for the polyesters useful in the invention include but are not limited to at least one of the following combinations of ranges: 1 to 15 mole % 2,2,4,4-tetramethyl-1,3-cyclobutanediol and 85 to 99 mole % 1,4-cyclohexanedimethanol; 1 to 14 mole % 2,2,4,4-tetramethyl-1,3-cyclobutanediol and 86 to 99 mole % 1,4-cyclohexanedimethanol; 1 to 13 mole % 2,2,4,4-tetramethyl-1,3-cyclobutanediol and 87 to 99 mole % 1,4-cyclohexanedimethanol; 1 to 12 mole % 2,2,4,4-tetramethyl-1,3-cyclobutanediol and 88 to 99 mole % 1,4-cyclohexanedimethanol; 1 to 11 mole % 2,2,4,4-tetramethyl-1,3-cyclobutanediol and 89 to 99 mole % 1,4-cyclohexanedimethanol; 1 to 10 mole % 2,2,4,4-tetramethyl-1,3-cyclobutanediol and 90 to 99 mole % 1,4-cyclohexanedimethanol; 1 to 9 mole % 2,2,4,4-tetramethyl-1,3-cyclobutanediol and 91 to 99 mole % 1,4-cyclohexanedimethanol; 1 to 8 mole % 2,2,4,4-tetramethyl-1,3-cyclobutanediol and 92 to 99 mole % 1,4-cyclohexanedimethanol; 1 to 7 mole % 2,2,4,4-tetramethyl-1,3-cyclobutanediol and 93 to 99 mole % 1,4-cyclohexanedimethanol; 1 to 6 mole % 2,2,4,4-tetramethyl-1,3-cyclobutanediol and 94 to 99 mole % 1,4-cyclohexanedimethanol; 1 to 5 mole % 2,2,4,4-tetramethyl-1,3-cyclobutanediol and 95 to 99 mole % 1,4-cyclohexanedimethanol; 1 to 4 mole % 2,2,4,4-tetramethyl-1,3-cyclobutanediol and 96 to 99 mole % 1,4-cyclohexanedimethanol; 1 to 3 mole % 2,2,4,4-tetramethyl-1,3-cyclobutanediol and 97 to 99 mole % 1,4-cyclohexanedimethanol; and 1 to 2 mole % 2,2,4,4-tetramethyl -1,3-cyclobutanediol and 98 to 99 mole % 1,4-cyclohexanedimethanol.

In other aspects of the invention, the glycol component for the polyesters useful in the film or sheet of the invention include but are not limited to at least one of the following combinations of ranges: 5 to 15 mole % 2,2,4,4-tetramethyl-1,3-cyclobutanediol and 85 to 95 mole % 1,4-cyclohexanedimethanol; and 5 to 10 mole % 2,2,4,4-tetramethyl -1,3-cyclobutanediol and 90 to 95 mole % 1,4-cyclohexanedimethanol.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.10 to 1.2 dL/g; 0.10 to 1.1 dL/g; 0.10 to 1 dL/g; 0.10 to less than 1 dL/g; 0.10 to 0.98 dL/g; 0.10 to 0.95 dL/g; 0.10 to 0.90 dL/g; 0.10 to 0.85 dL/g; 0.10 to 0.80 dL/g; 0.10 to 0.75 dL/g; 0.10 to less than 0.75 dL/g; 0.10 to 0.72 dL/g; 0.10 to 0.70 dL/g; 0.10 to less than 0.70 dL/g; 0.10 to 0.68 dL/g; 0.10 to less than 0.68 dL/g; 0.10 to 0.65 dL/g; 0.20 to 1.2 dL/g; 0.20 to 1.1 dL/g; 0.20 to 1 dL/g; 0.20 to less than 1 dL/g; 0.20 to 0.98 dL/g; 0.20 to 0.95 dL/g; 0.20 to 0.90 dL/g; 0.20 to 0.85 dL/g; 0.20 to 0.80 dL/g; 0.20 to 0.75 dL/g; 0.20 to less than 0.75 dL/g; 0.20 to 0.72 dL/g; 0.20 to 0.70 dL/g; 0.20 to less than 0.70 dL/g; 0.20 to 0.68 dL/g; 0.20 to less than 0.68 dL/g; 0.20 to 0.65 dL/g; 0.35 to 1.2 dL/g; 0.35 to 1.1 dL/g; 0.35 to 1 dL/g; 0.35 to less than 1 dL/g; 0.35 to 0.98 dL/g; 0.35 to 0.95 dL/g; 0.35 to 0.90 dL/g; 0.35 to 0.85 dL/g; 0.35 to 0.80 dL/g; 0.35 to 0.75 dL/g; 0.35 to less than 0.75 dL/g; 0.35 to 0.72 dL/g; 0.35 to 0.70 dL/g; 0.35 to less than 0.70 dL/g; 0.35 to 0.68 dL/g; 0.35 to less than 0.68 dL/g; 0.35 to 0.65 dL/g; 0.40 to 1.2 dL/g; 0.40 to 1.1 dL/g; 0.40 to 1 dL/g; 0.40 to less than 1 dL/g; 0.40 to 0.98 dL/g; 0.40 to 0.95 dL/g; 0.40 to 0.90 dL/g; 0.40 to 0.85 dL/g; 0.40 to 0.80 dL/g; 0.40 to 0.75 dL/g; 0.40 to less than 0.75 dL/g; 0.40 to 0.72 dL/g; 0.40 to 0.70 dL/g; 0.40 to less than 0.70 dL/g; 0.40 to 0.68 dL/g; 0.40 to less than 0.68 dL/g; 0.40 to 0.65 dL/g; greater than 0.42 to 1.2 dL/g; greater than 0.42 to 1.1 dL/g; greater than 0.42 to 1 dL/g; greater than 0.42 to less than 1 dL/g; greater than 0.42 to 0.98 dL/g; greater than 0.42 to 0.95 dL/g; greater than 0.42 to 0.90 dL/g; greater than 0.42 to 0.85 dL/g; greater than 0.42 to 0.80 dL/g; greater than 0.42 to 0.75 dL/g; greater than 0.42 to less than 0.75 dL/g; greater than 0.42 to 0.72 dL/g; greater than 0.42 to less than 0.70 dL/g; greater than 0.42 to 0.68 dL/g; greater than 0.42 to less than 0.68 dL/g; and greater than 0.42 to 0.65 dL/g.

For certain embodiments of the invention, the polyesters useful in the invention may exhibit at least one of the following inherent viscosities as determined in 60/40 (wt/wt) phenol/tetrachloroethane at a concentration of 0.5 g/100 ml at 25° C.: 0.45 to 1.2 dL/g; 0.45 to 1.1 dL/g; 0.45 to 1 dL/g; 0.45 to 0.98 dL/g; 0.45 to 0.95 dL/g; 0.45 to 0.90 dL/g; 0.45 to 0.85 dL/g; 0.45 to 0.80 dL/g; 0.45 to 0.75 dL/g; 0.45 to less than 0.75 dL/g; 0.45 to 0.72 dL/g; 0.45 to 0.70 dL/g; 0.45 to less than 0.70 dL/g; 0.45 to 0.68 dL/g; 0.45 to less than 0.68 dL/g; 0.45 to 0.65 dL/g; 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; or 0.65 to less than 0.70 dL/g; It is contemplated that the polyester compositions of the invention can possess at least one of the inherent viscosity ranges described herein and at least one of the monomer ranges for the compositions described herein unless otherwise stated. It is also contemplated that the polyester compositions of the invention can posses at least one of the Tg ranges described herein and at least one of the monomer ranges for the compositions described herein unless otherwise stated. It is also contemplated that the polyester compositions of the invention can posses at least one of the Tg ranges described herein, at least one of the inherent viscosity ranges described herein, and at least one of the monomer ranges for the compositions described herein unless otherwise stated.

For the desired polyester, the molar ratio of cis/trans 2,2,4,4-tetramethyl-1,3-cyclobutanediol can vary from the pure form of each or mixtures thereof. In certain embodiments, the molar percentages for cis and/or trans 2,2,4,4-tetramethyl-1,3-cyclobutanediol are greater than 50 mole % cis and less than 50 mole % trans; or greater than 55 mole % cis and less than 45 mole % trans; or 30 to 70 mole % cis and 70 to 30% trans; or 40 to 60 mole % cis and 60 to 40 mole % trans; or 50 to 70 mole % trans and 50 to 30 mole % cis; or 50 to 70 mole % cis and 50 to 30% trans or 60 to 70 mole % cis and 30 to 40 mole % trans; or greater than 70 mole % cis and less than 30 mole % trans; wherein the total sum of the mole percentages for cis- and trans-2,2,4,4-tetramethyl-1,3-cyclobutanediol is equal to 100 mole %. The molar ratio of cis/trans 1,4-cyclohexandimethanol can vary within the range of 50/50 to 0/100, for example, between 40/60 to 20/80.

In certain embodiments, terephthalic acid, or an ester thereof, such as, for example, dimethyl terephthalate, or a mixture of terephthalic acid and an ester thereof, makes up most or all of the dicarboxylic acid component used to form the polyesters useful in the invention. In certain embodiments, terephthalic acid residues can make up a portion or all of the dicarboxylic acid component used to form the present polyester at a concentration of at least 70 mole %, such as at least 80 mole %, at least 90 mole %, at least 95 mole %, at least 99 mole %, or the preferred embodiment of 100 mole %. In certain embodiments, polyesters with higher amounts of terephthalic acid can be used in order to produce higher impact strength properties. For purposes of this disclosure, the terms "terephthalic acid" and "dimethyl terephthalate are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid residues, the dicarboxylic acid component of the polyesters useful in the invention can comprise up to 30 mole %, up to 20 mole %, up to 10 mole %, up to 5 mole %, or up to 1 mole % of one or more modifying aromatic dicarboxylic acids. The preferred embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 30 mole %, from 0.01 to 20 mole %, from 0.01 to 10 mole %, from 0.01 to 5 mole %, or from 0.01 to 1 mole % of one or more modifying aromatic dicarboxylic acids. In one embodiment, modifying aromatic dicarboxylic acids that may be used in the present invention include but are not limited to those having up to 20 carbon atoms, and that can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, isophthalic acid is the modifying aromatic dicarboxylic acid. The preferred embodiment of the invention is for 100% of the dicarboxylic acid component based on terephthalic acid residues.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, malonic, succinic, glutaric, adipic, pimelic, suberic, azelaic and dodecanedioic dicarboxylic acids. Certain embodiments can also comprise 0.01 or more mole %, such as 0.1 or more mole %, 1 or more mole %, 5 or more mole %, or 10 or more mole % of one or more modifying aliphatic dicarboxylic acids. The preferred embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

The 1,4-cyclohexanedimethanol may be cis, trans, or a mixture thereof, for example, a cis/trans ratio of 60:40 to 40:60. In another embodiment, the trans-1,4-cyclohexanedimethanol can be present in the amount of 60 to 80 mole %.

The glycol component of the polyester portion of the polyester compositions useful in the invention can contain 14 mole % or less of one or more modifying glycols which are not 2,2,4,4-tetramethyl-1,3-cyclobutanediol or 1,4-cyclohexanedimethanol; in another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In the preferred embodiment, the polyesters useful in the invention may contain 0 mole % modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.1 to 10 mole %.

Modifying glycols useful in the polyesters useful in the invention refer to diols other than 2,2,4,4-tetramethyl-1,3-cyclobutanediol and 1,4-cyclohexanedimethanol and may contain 2 to 16 carbon atoms. Examples of suitable modifying glycols include, but are not limited to, ethylene glycol, diethylene glycol, 1,2-propanediol, 1,3-propanediol, neopentyl glycol, 1,4-butanediol, 1,5-pentanediol, 1,6-hexanediol, p-xylene glycol or mixtures thereof. In one embodiment, the modifying glycol is ethylene glycol. In another embodiment, the modifying glycols include but are not limited to 1,3-propanediol and/or 1,4-butanediol. In another embodiment, ethylene glycol is excluded as a modifying diol. In another embodiment, 1,3-propanediol and 1,4-butanediol are excluded as modifying diols. In another embodiment, 2,2-dimethyl-1,3-propanediol is excluded as a modifying diol. The polyesters useful the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, or 0.1 to 0.5 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched. In certain embodiments, the branching monomer or agent may be added prior to and/or during and/or after the polymerization.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

In another aspect, the invention relates to a process for producing a polyester. The process comprises:

(I) heating a mixture comprising the monomers useful in any of the polyesters useful in the invention in the presence of a catalyst at a temperature of 150 to 240° C. for a time sufficient to produce an initial polyester;

(II) heating the initial polyester of step (I) at a temperature of 240 to 320° C. for 1 to 4 hours; and (III) removing any unreacted glycols.

Suitable catalysts for use in this process include, but are not limited to, organo-zinc or tin compounds. The use of this type of catalyst is well known in the art. Examples of catalysts useful in the present invention include, but are not limited to, zinc acetate, butyltin tris-2-ethylhexanoate, dibutyltin diacetate, and/or dibutyltin oxide. Other catalysts may include, but are not limited to, those based on titanium, zinc, manganese, lithium, germanium, and cobalt. Catalyst amounts can range from 10 ppm to 20,000 ppm or 10 to 10,000 ppm, or 10 to 5000 ppm or 10 to 1000 ppm or 10 to 500 ppm, or 10 to 300 ppm or 10 to 250 based on the catalyst metal and based on the weight of the final polymer. The process can be carried out in either a batch or continuous process.

Typically, step (I) can be carried out until 50% by weight or more of the 2,2,4,4-tetramethyl-1,3-cyclobutanediol has been reacted. Step (I) may be carried out under pressure, ranging from atmospheric pressure to 100 psig. The term "reaction product" as used in connection with any of the catalysts useful in the invention refers to any product of a polycondensation or esterification reaction with the catalyst and any of the monomers used in making the polyester as well as the product of a polycondensation or esterification reaction between the catalyst and any other type of additive.

Typically, Step (II) and Step (III) can be conducted at the same time. These steps can be carried out by methods known in the art such as by placing the reaction mixture under a pressure ranging from 0.002 psig to below atmospheric pressure, or by blowing hot nitrogen gas over the mixture.

The polyesters useful in this invention can also be prepared by reactive melt blending and extrusion of two polyesters. For example: a polyester containing 100% terephthalic acid residues; 10 mole % 2,2,4,4-tetramethyl-1,3-cyclobutanediol residues, and 90 mole % 1,4-cyclohexanedimethanol can be prepared by reactive melt blending and extrusion of equal amounts of a polyester containing 100 mole % terephthalic residues and 100% 1,4-cyclohexanedimethanol with another polyester containing 100 mole % terephthalic residues; 80 mole % 1,4-cyclohexanedimethanol residues, and 20 mole % 2,2,4,4-tetramethyl-1,3-cyclobutanediol residues.

The polyesters of this invention, prepared in a reactor or by melt blending/extrusion, can subsequently be crystallized if needed and solid stated by techniques known in the art to further increase the IV.

Strain induced crystallization refers to a phenomenon in which an initially amorphous solid material undergoes a phase transformation in which some amorphous domains are converted to crystalline domains due to the application of strain. This phenomenon has important effects in strength and fatigue properties.

In one embodiment of the invention, the article of the invention has a strain induced crystallinity of from 8% to 35% when stretched at a temperature above the Tg of the polyester.

In one embodiment of the invention, the article of the invention has a strain induced crystallinity of from 8% to 35% when stretched at a temperature 10° C. above the Tg of the polyester.

In one embodiment of the invention, the article of the invention has a strain induced crystallinity of from 8% to 35% when stretched at a temperature 20° C. above the Tg of the polyester.

In one embodiment of the invention, the article of the invention has a strain induced crystallinity of from 10% to 35% when stretched at a temperature 10° C. above the Tg of the polyester.

In one embodiment of the invention, the article of the invention has a strain induced crystallinity of from 10% to 35% when stretched at a temperature 20° C. above the Tg of the polyester.

In one embodiment of the invention, the article of the invention has a strain induced crystallinity of from 10% to 30% when stretched at a temperature 10° C. above the Tg of the polyester.

In one embodiment of the invention, the article of the invention has a strain induced crystallinity of from 10% to 30% when stretched at a temperature 20° C. above the Tg of the polyester.

In one embodiment of the invention, the article of the invention has a strain induced crystallinity of from 10% to 25% when stretched at a temperature 10° C. above the Tg of the polyester.

In one embodiment of the invention, the article of the invention has a strain induced crystallinity of from 10% to 25% when stretched at a temperature 20° C. above the Tg of the polyester.

In one embodiment of the invention, the article of the invention has a strain induced crystallinity of from 15% to 30% when stretched at a temperature 10° C. above the Tg of the polyester.

In one embodiment of the invention, the article of the invention has a strain induced crystallinity of from 15% to 30% when stretched at a temperature 20° C. above the Tg of the polyester.

In addition, the polyester useful in this invention may also contain from 0.01 to 25% by weight or 0.01 to 20% by weight or 0.01 to 15% by weight or 0.01 to 10% by weight or 0.01 to 5% by weight of the total weight of the polyester composition of common additives such as colorants, dyes, mold release agents, reheat additives, flame retardants, plasticizers, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers; functionalized polyolefins, such as those containing methyl acrylate and/or glycidyl methacrylate; styrene-based block copolymeric impact modifiers; and various acrylic core/shell type impact modifiers. For example, UV additives can be incorporated into articles of manufacture through addition to the bulk, through application of a hard coat, or through coextrusion of a cap layer. Residues of such additives are also contemplated as part of the polyester composition.

The polyesters useful in the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, preferably about 0.1 to about 5 percent by weight, based on the total weight of the polyester.

Thermal stabilizers are compounds that stabilize polyesters during polyester manufacture and/or post polymerization including, but not limited to, phosphorous compounds including but not limited to phosphoric acid, phosphorous acid, phosphonic acid, phosphinic acid, phosphonous acid, and various esters and salts thereof. These can be present in the polyester compositions useful in the invention. The esters can be alkyl, branched alkyl, substituted alkyl, difunctional alkyl, alkyl ethers, aryl, and substituted aryl. In one embodiment, the number of ester groups present in the particular phosphorous compound can vary from zero up to the maximum allowable based on the number of hydroxyl groups present on the thermal stabilizer used. The term "thermal stabilizer" is intended to include the reaction products thereof. The term "reaction product" as used in connection with the thermal stabilizers of the invention refers to any product of a polycondensation or esterification reaction between the thermal stabilizer and any of the monomers used in making the polyester as well as the product of a polycondensation or esterification reaction between the catalyst and any other type of additive.

Reinforcing materials may be useful in the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials are glass, such as, fibrous glass filaments, mixtures of glass and talc, glass and mica, and glass and polymeric fibers.

The invention further relates to articles of manufacture. These articles include, but are not limited to, injection blow molded articles, injection stretch blow molded articles, extrusion blow molded articles, extrusion stretch blow molded articles, calendered articles, compression molded articles, and solution casted articles. Methods of making the articles of manufacture, include, but are not limited to, extrusion blow molding, extrusion stretch blow molding, injection blow molding, injection stretch blow molding, calendering, compression molding, and solution casting.

The invention further relates to the film(s) and/or sheet(s) comprising the polyester compositions of the invention. The methods of forming the polyesters into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

Examples of potential articles made from film and/or sheet include, but are not limited to, uniaxially stretched film, biaxially stretched film, shrink film (whether or not uniaxially or biaxially stretched), liquid crystal display film (including, but not limited to, diffuser sheets, compensation films and protective films), thermoformed sheet, graphic arts film, outdoor signs, skylights, coating(s), coated articles, painted articles, laminates, laminated articles, and/or multiwall films or sheets.

As used herein, the abbreviation "wt" means "weight".

The following examples further illustrate how the compositions of matter of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

The inherent viscosity of the polyesters was determined in 60/40 (wt/wt) phenol/tetrachloroethane at a concentration of 0.5 g/100 ml at 25° C.

The glycol content and the cis/trans ratio of the compositions were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

The crystallization half-time, $t_{1/2}$, was determined by measuring the light transmission of a sample via a laser and photo detector as a function of time on a temperature controlled hot stage. This measurement was done by exposing the polymers to a temperature, $T_{max}$, and then cooling it to the desired temperature. The sample was then held at the desired temperature by a hot stage while transmission measurements were made as a function of time. Initially, the sample was visually clear with high light transmission and became opaque as the sample crystallized. The crystallization half-time was recorded as the time at which the light transmission was halfway between the initial transmission and the final transmission. $T_{max}$ is defined as the temperature required to melt the crystalline domains of the sample (if crystalline domains are present). The $T_{max}$ reported in the examples below represents the temperature at which each sample was heated to condition the sample prior to crystallization half time measurement. The $T_{max}$ temperature is dependant on composition and is typically different for each polyester. For example, PCT may need to be heated to some temperature greater than 290° C. to melt the crystalline domains.

Differential scanning calorimetry (DSC) was performed using TA Instruments Model 2920 with a liquid nitrogen cooling accessory. The sample weight, in the range of 8 to 12 mg, was measured and recorded. Samples were first heated ($1^{st}$ heating scan) from 0 to 320° C. at 20° C./min, followed by cooling to 0° C. at 20° C./min (cooling scan), and then heated again from 0 to 320° C. at 20° C. min. Various thermal parameters were measured and recorded. $\Delta H_{cc}$ (cal/g) is the heat of crystallization measured from the cooling scan. $T_{cc}$ is the crystallization peak temperature on the cooling scan. $T_g$ is the glass transition temperature measured from $2^{nd}$ heating scan. $T_m$ is the melting point measured during the $2^{nd}$ heating scan. $\Delta H_{ch1}$ (cal/g) is the heat of crystallization measured during the $1^{st}$ heating scan. $\Delta H_{m1}$ (cal/g) is the heat of melting measured during the $1^{st}$ heating scan.

Unless otherwise specified, the cis/trans ratio of the 1,4 cyclohexanedimethanol used in the following examples was approximately 30/70, and could range from 35/65 to 25/75. Unless otherwise specified, the cis/trans ratio of the 2,2,4, 4-tetramethyl -1,3-cyclobutanediol used in the following examples was approximately 50/50.

The following abbreviations apply throughout the working examples and figures:

| TPA | Terephthalic acid |
| --- | --- |
| DMT | Dimethyl therephthalate |
| TMCD | 2,2,4,4-tetramethyl-1,3-cyclobutanediol |
| CHDM | 1,4-cyclohexanedimethanol |
| EG | ethylene glycol |
| IPA | Isophthalic acid |

Example 1

This example illustrates that TMCD is more effective at reducing the crystallization rate of PCT than EG or IPA.

A variety of copolyesters were prepared as described below. These copolyesters were all made with 200 ppm dibutyl tin oxide as the catalyst in order to minimize the effect of catalyst type and concentration on nucleation during crystallization studies. The cis/trans ratio of the 1,4-cyclohexanedimethanol was 31/69 while the cis/trans ratio of the 2,2,4,4-tetramethyl-1,3-cyclobutanediol is reported in Table 1.

For purposes of this example, the samples had sufficiently similar inherent viscosities thereby effectively eliminating this as a variable in the crystallization rate measurements.

Crystallization half-time measurements from the melt were made at temperatures from 140 to 200° C. at 10° C. increments and are reported in Table 1. The fastest crystallization half-time for each sample was taken as the minimum value of crystallization half-time as a function of temperature, typically occurring around 170 to 180° C. The fastest crystallization half-times for the samples are plotted in FIG. 1 as a function of mole % comonomer modification to PCT.

The data shows that 2,2,4,4-tetramethyl-1,3-cyclobutanediol is more effective than ethylene glycol and isophthalic acid at decreasing the crystallization rate (i.e., increasing the crystallization half-time). In addition, 2,2,4,4-tetramethyl-1,3-cyclobutanediol increases $T_g$ and lowers density.

late residues, 20 mol % dimethyl isophthalate residues, and 100 mol % 1,4-cyclohexanedimethanol residues (28/72 cis/trans).

A mixture of 56.63 g of dimethyl terephthalate, 55.2 g of 1,4-cyclohexanedimethanol, 14.16 g of dimethyl isophthalate, and 0.0419 g of dibutyl tin oxide was placed in a 500-milliliter flask equipped with an inlet for nitrogen, a metal stirrer, and a short distillation column. The flask was placed in a Wood's metal bath already heated to 210° C. The stirring speed was set to 200 RPM throughout the experiment. The contents of the flask were heated at 210° C. for 5 minutes and then the temperature was gradually increased to 290° C. over 30 minutes. The reaction mixture was held at 290° C. for 60 minutes and then vacuum was gradually applied over the next 5 minutes until the pressure inside the flask reached 100 mm of Hg. The pressure inside the flask was further reduced to 0.3 mm of Hg over the next 5 minutes. A pressure of 0.3 mm of Hg was maintained for a total time of 90 minutes to remove excess unreacted diols. A high melt viscosity, visually clear and colorless polymer was obtained with a glass transition temperature of 87.5° C. and an inherent viscosity of 0.63 dl/g. NMR analysis showed

TABLE 1

| | | | | | | Crystallization Half-times (min) | | | | | | |
|---|---|---|---|---|---|---|---|---|---|---|---|---|
| Example | Comonomer (mol %)[1] | IV (dl/g) | Density (g/ml) | $T_g$ (° C.) | $T_{max}$ (° C.) | at 140° C. (min) | at 150° C. (min) | at 160° C. (min) | at 170° C. (min) | at 180° C. (min) | at 190° C. (min) | at 200° C. (min) |
| 1A | 20.2% A[2] | 0.630 | 1.198 | 87.5 | 290 | 2.7 | 2.1 | 1.3 | 1.2 | 0.9 | 1.1 | 1.5 |
| 1B | 19.8% B | 0.713 | 1.219 | 87.7 | 290 | 2.3 | 2.5 | 1.7 | 1.4 | 1.3 | 1.4 | 1.7 |
| 1C | 20.0% C | 0.731 | 1.188 | 100.5 | 290 | >180 | >60 | 35.0 | 23.3 | 21.7 | 23.3 | 25.2 |
| 1D | 40.2% A[2] | 0.674 | 1.198 | 81.2 | 260 | 18.7 | 20.0 | 21.3 | 25.0 | 34.0 | 59.9 | 96.1 |
| 1E | 34.5% B | 0.644 | 1.234 | 82.1 | 260 | 8.5 | 8.2 | 7.3 | 7.3 | 8.3 | 10.0 | 11.4 |
| 1F | 40.1% C | 0.653 | 1.172 | 122.0 | 260 | >10 days | >5 days | >5 days | 19204 | >5 days | >5 days | >5 days |
| 1G | 14.3% D | 0.646[3] | 1.188 | 103.0 | 290 | 55.0 | 28.8 | 11.6 | 6.8 | 4.8 | 5.0 | 5.5 |
| 1H | 15.0% E | 0.728[4] | 1.189 | 99.0 | 290 | 25.4 | 17.1 | 8.1 | 5.9 | 4.3 | 2.7 | 5.1 |

[1]The balance of the diol component of the polyesters in Table 1 is 1,4-cyclohexanedimethanol; and the balance of the dicarboxylic acid component of the polyesters in Table 1 is dimethyl terephthalate; if the dicarboxylic acid is not described, it is 100 mole % dimethyl terephthalate.
[2]100 mole % 1,4-cyclohexanedimethanol.
[3]A film was pressed from the ground polyester of Example 1G at 240° C. The resulting film had an inherent viscosity value of 0.575 dL/g.
[4]A film was pressed from the ground polyester of Example 1H at 240° C. The resulting film had an inherent viscosity value of 0.0.652 dL/g.
where:
A is Isophthalic Acid
B is Ethylene Glycol
C is 2,2,4,4-Tetramethyl-1,3-cyclobutanediol (approx. 50/50 cis/trans)
D is 2,2,4,4-Tetramethyl-1,3-cyclobutanediol (98/2 cis/trans)
E is 2,2,4,4-Tetramethyl-1,3-cyclobutanediol (5/95 cis/trans)

As shown in Table 1 and FIG. 1, 2,2,4,4-tetramethyl-1,3-cyclobutanediol is more effective than other comonomers, such ethylene glycol and isophthalic acid, at increasing the crystallization half-time, i.e., the time required for a polymer to reach half of its maximum crystallinity. By decreasing the crystallization rate of PCT (increasing the crystallization half-time), amorphous articles based on 2,2,4,4-tetramethyl-1,3-cyclobutanediol-modified PCT as described herein may be fabricated by methods known in the art. As shown in Table 1, these materials can exhibit higher glass transition temperatures and lower densities than other modified PCT copolyesters.

Preparation of the polyesters shown on Table 1 is described below.

Example 1A

This example illustrates the preparation of a copolyester with a target composition of 80 mol % dimethyl terephthalate residues, 20 mol % dimethyl isophthalate residues, and 100 mol % 1,4-cyclohexanedimethanol residues (28/72 cis/trans).

that the polymer was composed of 100 mol % 1,4-cyclohexanedimethanol residues and 20.2 mol % dimethyl isophthalate residues.

Example 1B

This example illustrates the preparation of a copolyester with a target composition of 100 mol % dimethyl terephthalate residues, 20 mol % ethylene glycol residues, and 80 mol % 1,4-cyclohexanedimethanol residues (32/68 cis/trans).

A mixture of 77.68 g of dimethyl terephthalate, 50.77 g of 1,4-cyclohexanedimethanol, 27.81 g of ethylene glycol, and 0.0433 g of dibutyl tin oxide was placed in a 500-milliliter flask equipped with an inlet for nitrogen, a metal stirrer, and a short distillation column. The flask was placed in a Wood's metal bath already heated to 200° C. The stirring speed was set to 200 RPM throughout the experiment. The contents of the flask were heated at 200° C. for 60 minutes and then the temperature was gradually increased to 210° C. over 5 minutes. The reaction mixture was held at 210° C. for 120 minutes and then heated up to 280° C. in 30 minutes. Once at 280° C., vacuum was gradually applied over the next 5 minutes until the pressure inside the flask reached 100 mm of Hg. The pressure inside the flask was further reduced to 0.3 mm of Hg over the next 10 minutes. A pressure of 0.3 mm of Hg was maintained for a total time of 90 minutes to remove excess unreacted diols. A high melt viscosity, visually clear and colorless polymer was obtained with a glass transition temperature of 87.7° C. and an inherent viscosity of 0.71 dl/g. NMR analysis showed that the polymer was composed of 19.8 mol % ethylene glycol residues.

Example 1C

This example illustrates the preparation of a copolyester with a target composition of 100 mol % dimethyl terephthalate residues, 20 mol % 2,2,4,4-tetramethyl-1,3-cyclobutanediol residues, and 80 mol % 1,4-cyclohexanedimethanol residues (31/69 cis/trans).

A mixture of 77.68 g of dimethyl terephthalate, 48.46 g of 1,4-cyclohexanedimethanol, 17.86 g of 2,2,4,4-tetramethyl-1,3-cyclobutanediol, and 0.046 g of dibutyl tin oxide was placed in a 500-milliliter flask equipped with an inlet for nitrogen, a metal stirrer, and a short distillation column. This polyester was prepared in a manner similar to that described in Example 1A. A high melt viscosity, visually clear and colorless polymer was obtained with a glass transition temperature of 100.5° C. and an inherent viscosity of 0.73 dl/g. NMR analysis showed that the polymer was composed of 80.5 mol % 1,4-cyclohexanedimethanol residues and 19.5 mol % 2,2,4,4-tetramethyl-1,3-cyclobutanediol residues.

Example 1D

This example illustrates the preparation of a copolyester with a target composition of 100 mol % dimethyl terephthalate residues, 40 mol % dimethyl isophthalate residues, and 100 mol % 1,4-cyclohexanedimethanol residues (28/72 cis/trans).

A mixture of 42.83 g of dimethyl terephthalate, 55.26 g of 1,4-cyclohexanedimethanol, 28.45 g of dimethyl isophthalate, and 0.0419 g of dibutyl tin oxide was placed in a 500-milliliter flask equipped with an inlet for nitrogen, a metal stirrer, and a short distillation column. The flask was placed in a Wood's metal bath already heated to 210° C. The stirring speed was set to 200 RPM throughout the experiment. The contents of the flask were heated at 210° C. for 5 minutes and then the temperature was gradually increased to 290° C. over 30 minutes. The reaction mixture was held at 290° C. for 60 minutes and then vacuum was gradually applied over the next 5 minutes until the pressure inside the flask reached 100 mm of Hg. The pressure inside the flask was further reduced to 0.3 mm of Hg over the next 5 minutes. A pressure of 0.3 mm of Hg was maintained for a total time of 90 minutes to remove excess unreacted diols. A high melt viscosity, visually clear and colorless polymer was obtained with a glass transition temperature of 81.2° C. and an inherent viscosity of 0.67 dl/g. NMR analysis showed that the polymer was composed of 100 mol % 1,4-cyclohexanedimethanol residues and 40.2 mol % dimethyl isophthalate residues.

Example 1E

This example illustrates the preparation of a copolyester with a target composition of 100 mol % dimethyl terephthalate residues, 40 mol % ethylene glycol residues, and 60 mol % 1,4-cyclohexanedimethanol residues (31/69 cis/trans).

A mixture of 81.3 g of dimethyl terephthalate, 42.85 g of 1,4-cyclohexanedimethanol, 34.44 g of ethylene glycol, and 0.0419 g of dibutyl tin oxide was placed in a 500-milliliter flask equipped with an inlet for nitrogen, a metal stirrer, and a short distillation column. The flask was placed in a Wood's metal bath already heated to 200° C. The stirring speed was set to 200 RPM throughout the experiment. The contents of the flask were heated at 200° C. for 60 minutes and then the temperature was gradually increased to 210° C. over 5 minutes. The reaction mixture was held at 210° C. for 120 minutes and then heated up to 280° C. in 30 minutes. Once at 280° C., vacuum was gradually applied over the next 5 minutes until the pressure inside the flask reached 100 mm of Hg. The pressure inside the flask was further reduced to 0.3 mm of Hg over the next 10 minutes. A pressure of 0.3 mm of Hg was maintained for a total time of 90 minutes to remove excess unreacted diols. A high melt viscosity, visually clear and colorless polymer was obtained with a glass transition temperature of 82.1° C. and an inherent viscosity of 0.64 dl/g. NMR analysis showed that the polymer was composed of 34.5 mol % ethylene glycol residues.

Example 1F

This example illustrates the preparation of a copolyester with a target composition of 100 mol % dimethyl terephthalate residues, 40 mol % 2,2,4,4-tetramethyl-1,3-cyclobutanediol residues, and 60 mol % 1,4-cyclohexanedimethanol residues (31/69 cis/trans).

A mixture of 77.4 g of dimethyl terephthalate, 36.9 g of 1,4-cyclohexanedimethanol, 32.5 g of 2,2,4,4-tetramethyl-1,3-cyclobutanediol, and 0.046 g of dibutyl tin oxide was placed in a 500-milliliter flask equipped with an inlet for nitrogen, a metal stirrer, and a short distillation column. The flask was placed in a Wood's metal bath already heated to 210° C. The stirring speed was set to 200 RPM throughout the experiment. The contents of the flask were heated at 210° C. for 3 minutes and then the temperature was gradually increased to 260° C. over 30 minutes. The reaction mixture was held at 260° C. for 120 minutes and then heated up to 290° C. in 30 minutes. Once at 290° C., vacuum was gradually applied over the next 5 minutes until the pressure inside the flask reached 100 mm of Hg. The pressure inside the flask was further reduced to 0.3 mm of Hg over the next 5 minutes. A pressure of 0.3 mm of Hg was maintained for a total time of 90 minutes to remove excess unreacted diols. A high melt viscosity, visually clear and colorless polymer was obtained with a glass transition temperature of 122° C. and an inherent viscosity of 0.65 dl/g. NMR analysis showed that the polymer was composed of 59.9 mol % 1,4-cyclohexanedimethanol residues and 40.1 mol % 2,2,4,4-tetramethyl-1,3-cyclobutanediol residues.

Example 1G

This example illustrates the preparation of a copolyester with a target composition of 100 mol % dimethyl terephthalate residues, 20 mol % 2,2,4,4-tetramethyl-1,3-cyclobutanediol residues (98/2 cis/trans), and 80 mol % 1,4-cyclohexanedimethanol residues (31/69 cis/trans).

A mixture of 77.68 g of dimethyl terephthalate, 48.46 g of 1,4-cyclohexanedimethanol, 20.77 g of 2,2,4,4-tetramethyl-1,3-cyclobutanediol, and 0.046 g of dibutyl tin oxide was placed in a 500-milliliter flask equipped with an inlet for nitrogen, a metal stirrer, and a short distillation column. The flask was placed in a Wood's metal bath already heated to 210° C. The stirring speed was set to 200 RPM throughout the experiment. The contents of the flask were heated at 210° C. for 3 minutes and then the temperature was gradually increased to 260° C. over 30 minutes. The reaction mixture was held at 260° C. for 120 minutes and then heated up to 290° C. in 30 minutes. Once at 290° C., vacuum was gradually applied over the next 5 minutes until the pressure inside the flask reached 100 mm of Hg and the stirring speed was also reduced to 100 RPM. The pressure inside the flask was further reduced to 0.3 mm of Hg over the next 5 minutes and the stirring speed was reduced to 50 RPM. A pressure of 0.3 mm of Hg was maintained for a total time of 60 minutes to remove excess unreacted diols. A high melt viscosity, visually clear and colorless polymer was obtained with a glass transition temperature of 103° C. and an inherent viscosity of 0.65 dl/g. NMR analysis showed that the polymer was composed of 85.7 mol % 1,4-cyclohexanedimethanol residues and 14.3 mol % 2,2,4,4-tetramethyl-1,3-cyclobutanediol residues.

Example 1H

This example illustrates the preparation of a copolyester with a target composition of 100 mol % dimethyl terephthalate residues, 20 mol % 2,2,4,4-tetramethyl-1,3-cyclobutanediol residues (5/95 cis/trans), and 80 mol % 1,4-cyclohexanedimethanol residues (31/69 cis/trans).

A mixture of 77.68 g of dimethyl terephthalate, 48.46 g of 1,4-cyclohexanedimethanol, 20.77 g of 2,2,4,4-tetramethyl-1,3-cyclobutanediol, and 0.046 g of dibutyl tin oxide was placed in a 500-milliliter flask equipped with an inlet for nitrogen, a metal stirrer, and a short distillation column. The flask was placed in a Wood's metal bath already heated to 210° C. The stirring speed was set to 200 RPM at the beginning of the experiment. The contents of the flask were heated at 210° C. for 3 minutes and then the temperature was gradually increased to 260° C. over 30 minutes. The reaction mixture was held at 260° C. for 120 minutes and then heated up to 290° C. in 30 minutes. Once at 290° C., vacuum was gradually applied over the next 5 minutes with a set point of 100 mm of Hg and the stirring speed was also reduced to 100 RPM. The pressure inside the flask was further reduced to a set point of 0.3 mm of Hg over the next 5 minutes and the stirring speed was reduced to 50 RPM. This pressure was maintained for a total time of 60 minutes to remove excess unreacted diols. It was noted that the vacuum system failed to reach the set point mentioned above, but produced enough vacuum to produce a high melt viscosity, visually clear and colorless polymer with a glass transition temperature of 99° C. and an inherent viscosity of 0.73 dl/g. NMR analysis showed that the polymer was composed of 85 mol % 1,4-cyclohexanedimethanol residues and 15 mol % 2,2,4,4-tetramethyl-1,3-cyclobutanediol residues.

Example 2

This example illustrates that TMCD is more effective at reducing the crystallization rate of PCT than EG or IPA. This example also illustrates the improvements in heat resistance, as measured by $T_m$ and $T_g$, provided by TMCD modification over EG or IPA modification of PCT at similar crystallization rates.

Materials were prepared via melt compounding Tritan™ TX1000 (IV=0.72 dl/g) with PCT 13787 (IV=0.76 dl/g) at 300° C. on a Sterling 1.5 inch pelletizing single screw extruder at different weight ratios. Tritan™ TX1000 and PCT 13787 are produced commercially by Eastman Chemical Company. The resulting compositions and IVs are shown as materials A, B, and C in Table 2. A portion of materials A, B, and C were solid stated to higher IVs, materials D, E, and F respectively, in a reactor at 225° C. using nitrogen. Materials G, H, and I are produced commercially by Eastman Chemical Company. Materials J and K were produced in a pilot plant at Eastman Chemical Company.

Material G is unmodified PCT. During the cooling scan of the DSC, crystallization releases 10 cal/g of heat ($\Delta H_{cc}$). This corresponds to about 34% crystallinity being formed during cooling from the melt at 320° C. to 0° C. at 20° C. per minute assuming a specific heat of fusion of 29 cal/g. The percent crystallinity formed during cooling is calculated by equation (1).

$$X_c = \frac{(\Delta H_{cc})}{29} \times 100 \qquad (1)$$

The peak temperature in the crystallization exotherm ($T_{cc}$) occurs at 227° C. for unmodified PCT.

Comonomer modification of PCT will slow down the crystallization rate of PCT. As a result modified PCT materials will release less heat during the cooling from the melt at 320° C. to 0° C. than unmodified PCT. The data in Table 2 shows that TMCD is more effective than IPA or EG modification of PCT at slowing down the crystallization rate as evidenced by a lower $\Delta H_{cc}$ on a mole percent modification of PCT. For example, unmodified PCT (Material G) releases 10 cal/g during the cooling scan. Modification of PCT with 17 mole % IPA (Material I), results in a slower crystallization rate as evidenced by $\Delta H_{cc}$=8.0 cal/g being released during the cooling scan due to crystallization. Modification of PCT with EG, results in a slower crystallization rate as evidenced by $\Delta H_{cc}$=9.0 cal/g for PCT modified by 16.6 mole % EG (Material J) and $\Delta H_{cc}$=5.8 cal/g for PCT modified by 22.6 mole % EG (Material K). In comparison, PCT only needs to be modified by approximately 5 mole % TMCD (Materials A, D, and E) to slow down the crystallization rate to achieve a similar heat release ($\Delta H_{cc}$~8.0 cal/g) during the cooling scan compared with ~17 mole % modification by EG or IPA. At similar crystallization rates or $\Delta H_{cc}$, PCT modified by TMCD have higher melting points ($T_m$) and glass transition temperatures ($T_g$) than PCT modified by IPA or EG. For example, at $\Delta H_{cc}$~8.0 cal/g, PCT requires approximately 17 mole % EG or IPA modification resulting in a Tm~261° C. and Tg~89° C. (Materials I, J, and K). At $\Delta H_{cc}$~8.0 cal/g, PCT requires only about 5 mole % TMCD (Materials A, D, and E) modification resulting in a Tm~279° C. and Tg~94° C. As a result, the PCT materials modified by TMCD will have better heat resistance. $T_{cc}$ is also reduced more effectively for PCT modified by TMCD than PCT modified by EG or IPA on a mole % basis. This is another indicator that TMCD is more effective at slowing down the crystallization rate of PCT than either EG or IPA on a mole % basis.

TABLE 2

Thermal Properties of Unmodified and Modified PCT

| Material | Composition by NMR (mole %, comonomer) | IV (dl/g) | $\Delta H_{cc}$ (cal/g) | $T_{cc}$ (° C.) | $T_m$ (° C.) | Tg (° C.) |
|---|---|---|---|---|---|---|
| A | 4.4, TMCD | 0.73 | 7.6 | 203 | 280 | 92 |
| B | 7.7, TMCD | 0.72 | 5.5 | 184 | 275 | 95 |
| C | 9.1, TMCD | 0.72 | 3.2 | 176 | 270 | 98 |
| D | 4.2, TMCD | 0.81 | 8.3 | 202 | 279 | 93 |
| E | 6.7, TMCD | 0.84 | 7.9 | 194 | 275 | 98 |
| F | 9.7, TMCD | 0.85 | 3.0 | 175 | 268 | 100 |
| G | 0 | 0.76 | 10.0 | 227 | 288 | 93 |
| H | 5.0, IPA | 0.84 | 9.3 | 207 | 280 | 92 |
| I | 17.0, IPA | 0.77 | 8.0 | 182 | 262 | 91 |
| J | 16.6, EG | 0.69 | 9.0 | 189 | 265 | 87 |
| K | 22.6, EG | 0.74 | 5.8 | 165 | 257 | 86 |

Example 3

This example illustrates that PCT materials modified by TMCD can be extruded as amorphous films and subsequently stretched above Tg to create clear semi-crystalline films as a result of strain induced crystallinity.

Three modified PCT materials targeting approximately 5, 10, and 15 mole percent TMCD were prepared by melt compounding PCT 13787 and Tritan™ TX1000 at different weight ratios at 300° C. on a Sterling 1.5 inch pelletizing single screw extruder. Tritan™ TX1000 and PCT 13787 are produced commercially by Eastman Chemical Company. The resulting samples are described in Table 3.

TABLE 3

Materials prepared by melt blending Tritan ™ TX1000 and PCT 13787.

| Material | PCT/TX 1000 Weight Ratio | Mole % TMCD Composition by NMR | IV (dl/g) |
|---|---|---|---|
| A | ~3/1 | 4.9 | 0.72 |
| B | ~1/1 | 10.2 | 0.72 |
| C | ~1/3 | 15.5 | 0.71 |

A sample of Material A, B, and C was solid stated, as shown in Table 4, at 225° C. under vacuum (0.5 torr). Materials A, B, and C were also solid stated using nitrogen flow at 225° C. These results are shown in Table 5.

TABLE 4

Solid stating of PCT modified by TMCD at 225° C. at 0.5 torr.

| Material | IV t = 0 hr (dl/g) | IV t = 6 hr (dl/g) | IV t = 24 hr (dl/g) |
|---|---|---|---|
| A | 0.72 | 0.78 | 0.88 |
| B | 0.72 | 0.80 | 0.90 |
| C | 0.71 | 0.73 | 0.86 |

TABLE 5

Solid stating of PCT modified by TMCD at 225° C. with nitrogen.

| Material | Mole % TMCD | Temp (° C.) | Time (hr) | IV (dl/g) |
|---|---|---|---|---|
| A | 4.9 | — | 0 | 0.72 |
| A1 | 4.9 | 225 | 5 | 0.77 |
| A2 | 4.9 | 225 | 11 | 0.82 |
| A3 | 4.9 | 225 | 17 | 0.87 |
| B | 10.2 | — | 0 | 0.72 |
| B1 | 10.2 | 225 | 5 | 0.74 |
| B2 | 10.2 | 225 | 11 | 0.76 |
| B3 | 10.2 | 225 | 17 | 0.84 |
| C | 15.5 | — | 0 | 0.71 |
| C1 | 15.5 | 225 | 5 | 0.75 |
| C2 | 15.5 | 225 | 11 | 0.83 |
| C3 | 15.5 | 215 | 25 | 0.87 |

Materials A, A1, A2, A3, B, B1, B2, B3, C, C1, C2, and C3 were extruded into 20 mil clear amorphous film using a Killian 1 inch single screw extruder operating at 300° C. The 20 mil (0.51 mm) films were then cut into 4.5" squares for stretching in a Bruckner KARO IV Laboratory stretching machine. The grip distances were 110 mm. Films of all the materials were uniaxially stretched to different draw ratios ($\lambda$) at temperatures relative to $T_g$ ($T_g$+10 and $T_g$+20° C.) and a nominal strain rate of 100% sec$^{-1}$. All the stretched films were visually clear. The percentage of strain induced crystallinity ($X_c$) in the stretched films was determined by equation (2) from the first heating scan of films evaluated in a DSC.

$$X_c = \frac{(\Delta H_{m1} - \Delta H_{CH1})}{29} \times 100 \qquad (2)$$

Table 6 shows the various stretched films had developed crystallinity as result of strain induced crystallization for materials with different levels of TMCD with similar IVs (Materials A2, B2, and C2). The amount of crystallinity developed in the stretch films was higher for a given material stretched at Tg+20° C. compared to Tg+10° C. For a given stretching temperature relative to Tg, materials with higher amounts of TMCD developed less strain induced crystallinity. There was little effect of draw ratio from 3 to 4.5 on the amount of crystallinity developed for the various materials and stretching temperature. Higher stretching temperatures relative to Tg allowed the films to be stretched to higher draw ratios. In summary, PCT films modified by TMCD could be extruded into clear amorphous films that could be subsequently stretched above Tg to produce clear semi-crystalline films as a result of strain induced crystallization.

TABLE 6

Amount of strain induced crystallinity ($X_c$) of clear stretched films of PCT modified by TMCD.

| Material | Mole % TMCD | Tg (° C.) | Film IV (dl/g) | $\lambda$ | $X_c$ (%) Stretched at Tg + 10° C. | $X_c$ (%) Stretched at Tg + 20° C. |
|---|---|---|---|---|---|---|
| A2 | 5 | 98 | 0.76 | 3 | 23.5 | — |
| A2 | 5 | 98 | 0.76 | 3.5 | 24.4 | 26.8 |
| A2 | 5 | 98 | 0.76 | 4.0 | 22.2 | 30.2 |
| A2 | 5 | 98 | 0.76 | 4.5 | — | 31.4 |
| B2 | 10. | 101 | 0.76 | 3 | 17.4 | — |
| B2 | 10 | 101 | 0.76 | 3.5 | 18.7 | 23.2 |

TABLE 6-continued

Amount of strain induced crystallinity ($X_c$) of clear stretched films of PCT modified by TMCD.

| Material | Mole % TMCD | Tg (° C.) | Film IV (dl/g) | λ | $X_c$ (%) Stretched at Tg + 10° C. | $X_c$ (%) Stretched at Tg + 20° C. |
|---|---|---|---|---|---|---|
| B2 | 10 | 101 | 0.76 | 4.0 | 17.9 | 23.4 |
| B2 | 10 | 101 | 0.76 | 4.5 | — | 24.7 |
| C2 | 15 | 106 | 0.76 | 3 | 8.6 | — |
| C2 | 15 | 106 | 0.76 | 3.5 | 10.5 | 15.3 |
| C2 | 15 | 106 | 0.76 | 4.0 | 10.7 | 14.7 |
| C2 | 15 | 106 | 0.76 | 4.5 | — | 14.3 |

Example 4

This example illustrates that PCT materials modified by TMCD can be injection molded into an amorphous bottle preform and subsequently reheated above Tg and blown into a bottle with clear semi-crystalline side-walls. In addition, this example illustrates that similar levels of side wall crystallinity are achieved in comparison to PET and PCT modified by IPA with significantly higher Tm's than PET and PCT modified by IPA.

Materials were prepared at 3 levels of TMCD (~5, 7.5, and 10 mole %) modification to PCT and two IV levels (~0.72 and ~0.84 dl/g) in a similar manner to Examples 2 and 3 by melt blending Tritan™ TX1000 with PCT 13378 and subsequent solid stating. During the melt blending, black iron oxide at 20 ppm was compounded in to serve as a reheat aid for the blow molding of bottles. In addition, Material G, a commercial grade material based on PCT modified by 17 mole % IPA and Material H (Parastar 3000), a commercial grade PET material produced by Eastman Chemical Company Materials, were used for comparison. All the materials are described in Table 7. Materials were dried and injection molded into 16 oz. Boston round preforms using an Arburg injection molding machine at melt temperatures approximately 20° C. above the Tm of each material. The preforms were all clear and amorphous prior to blow molding. The amorphous preforms were then reheat blown into 16 oz. Boston round bottles using a Sidel SBO1 blow molding machine. Bottles were reheat blown at preform surface temperatures approximately 20° C. above Tg for each material into the blow mold operating at 7° C. All the blown bottles were visually clear. Samples were cut out of the sidewall of each bottle and analyzed in a DSC to determine the amount of crystallinity that was developed in the blow molding process. The percentage of strain induced crystallinity ($X_c$) in the sidewalls of the blown bottle was determined by equation (3) from the first heating scan of films evaluated in a DSC.

$$X_c = \frac{(\Delta H_{m1} - \Delta H_{CH1})}{29} \times 100 \quad (3)$$

The Tm reported in Table 8 was also taken from the first heating scan. Table 8 shows that the PCT materials modified by TMCD (Materials A thru F) developed similar levels of crystallinity in the sidewall in comparison to commercial materials G and H. At these similar levels of crystallinity, the PCT modified materials have significantly higher melting points, Tm, than materials commercial materials G and H.

TABLE 7

Materials used in the reheat blow molding of 16 oz. Boston round bottles.

| Material | Mole % TMCD | IV (dl/g) | Tg (° C.) | Tm (° C.) |
|---|---|---|---|---|
| A | 5.2 | 0.72 | 92 | 280 |
| B | 7.5 | 0.72 | 95 | 276 |
| C | 9.5 | 0.72 | 98 | 272 |
| D | 4.6 | 0.85 | 93 | 278 |
| E | 7.0 | 0.85 | 98 | 276 |
| F | 9.7 | 0.83 | 100 | 269 |
| G | n.a. | 0.77 | 91 | 262 |
| H | n.a. | 0.80 | 78 | 235 |

TABLE 8

Amount of strain induced crystallinity ($X_c$) and Tm of blown bottle sidewalls.

| Material | $X_c$ (%) | Tm (° C.) |
|---|---|---|
| A | 27 | 282 |
| B | 28 | 279 |
| C | 27 | 276 |
| D | 30 | 279 |
| E | 27 | 274 |
| F | 25 | 271 |
| G | 31 | 259 |
| H | 30 | 243 |

It can be clearly seen from a comparison of the data in the above relevant working examples that the polyesters of the present invention offer a definite advantage over the commercially available polyesters with regard to glass transition temperature, density, slow crystallization rate, melt viscosity, and toughness.

The invention has been described in detail with reference to the embodiments disclosed herein, but it will be understood that variations and modifications can be effected within the spirit and scope of the invention.

We claim:

1. A clear, semicrystalline, strain induced crystallized article comprising at least one polyester which comprises:
    (a) a dicarboxylic acid component comprising:
        i) 95 to 99.99 mole % of terephthalic acid residues; and
        ii) 0.01 to 5 mole % of isophthalic acid residues; and
    (b) a glycol component comprising:
        i) 4.9 to 10.2 mole % of 2,2,4,4-tetramethyl-1,3-cyclobutanediol residues; and
        ii) 89.8 to 95.1 mole % of 1,4-cyclohexanedimethanol residues,
    wherein the total mole % of the dicarboxylic acid component is 100 mole %, and the total mole % of the glycol component is 100 mole %;
    wherein the polyester is solid stated to increase the inherent viscosity (IV) of the polyester and wherein the IV for the solid stated polyester is from 0.76 to 1.1 dL/g as determined in 60/40 (wt/wt) phenol/tetrachloroethane at a concentration of 0.5 g/100 ml at 25° C.;
    wherein said polyester has a glass transition temperature (Tg) of 90 to 110° C., and
    wherein the article has a strain induced crystallinity of from 15% to 35% when stretched at a draw ratio of 3 to 4 times and a temperature 10° C. above the Tg of the polyester or has a strain induced crystallinity of from 23.2% to 35% when stretched at a draw ratio of 3.5 to 4.5 times and a temperature 20° C. above the Tg.

2. The article of claim 1, wherein the inherent viscosity of the solid stated polyester is from 0.76 to less than 1.0 dL/g.

3. The article of claim 1, wherein the inherent viscosity of the solid stated polyester is from 0.76 to 0.95 dL/g.

4. The article of claim 1, wherein the glycol component comprises: 5 to 10 mole % of 2,2,4,4-tetramethyl-1,3-cyclobutanediol residues, and 90 to 95 mole % of 1,4-cyclohexanedimethanol residues.

5. The article of claim 1, wherein the article has a strain induced crystallinity of from 15% to 30% when stretched at a draw ratio of 3 to 4 times and a temperature 10° C. above the Tg of the polyester.

6. The article of claim 1, wherein said solid stated polyester has a crystallization half-time of less than 10 minutes but greater than about 30 seconds at 170° C.

7. The article of claim 1, wherein the yellowness index of said polyester according to ASTM D-1925 is less than 50.

8. The article of claim 1, wherein the polyester has a b* value of from −10 to less than 10 and a L* value from 50 to 90 according to the L*, a* and b* color system of the CIE (International Commission on Illumination).

9. The article according to claim 1, wherein the article is a bottle with clear semi-crystalline side-walls.

\* \* \* \* \*